United States Patent
Verdyck

(10) Patent No.: US 6,597,385 B2
(45) Date of Patent: Jul. 22, 2003

(54) METHOD FOR THERMAL PRINTING

(75) Inventor: Dirk Verdyck, Merksem (BE)

(73) Assignee: AGFA-Gevaert, Mortsel (BE)

( * ) Notice: Subject to any disclaimer, the term of this patent is extended or adjusted under 35 U.S.C. 154(b) by 35 days.

(21) Appl. No.: 10/024,067

(22) Filed: Dec. 18, 2001

(65) Prior Publication Data
US 2002/0136582 A1 Sep. 26, 2002

Related U.S. Application Data
(60) Provisional application No. 60/269,965, filed on Feb. 20, 2001.

(30) Foreign Application Priority Data
Jan. 5, 2001 (EP) .............................. 01000003

(51) Int. Cl.$^7$ ......................... G01D 15/10; B41J 2/355; B41J 2/365
(52) U.S. Cl. ...................... 347/171; 347/183; 347/188; 347/191
(58) Field of Search ................................ 347/171, 176, 347/183, 188, 191, 192, 193, 194, 195; 400/120.01, 120.07, 120.09, 120.11, 120.13, 120.14, 120.15

(56) References Cited

U.S. PATENT DOCUMENTS

| | | | |
|---|---|---|---|
| 5,051,755 A | | 9/1991 | Takahashi et al. ............. 347/184 |
| 5,956,067 A | * | 9/1999 | Isono et al. ................... 347/176 |
| 6,249,299 B1 | * | 6/2001 | Tainer ........................... 347/191 |
| 6,533,477 B2 | * | 3/2003 | Fukuda ..................... 400/120.01 |

FOREIGN PATENT DOCUMENTS

| | | |
|---|---|---|
| EP | 0 536 822 A1 | 9/1992 |
| EP | 0 654 355 A1 | 5/1995 |
| JP | 09 074486 | 3/1997 |

* cited by examiner

Primary Examiner—Lamson Nguyen
Assistant Examiner—K. Feggins
(74) Attorney, Agent, or Firm—John A. Merecki; Hoffman, Warnick & D'Alessandro

(57) ABSTRACT

A method for printing an image using a thermal printing system comprising a thermal printer having a thermal head TH incorporating a plurality of energisable heating elements $H^n$ and a thermographic material m, comprises several steps. These steps comprise supplying image data Id corresponding to a plurality of output values $D^n$ to a processing unit, reading a first table LUT1 comprising first entries for desired output values $D_k$ and second entries for sequences $S_k$ of time slices $s_i$ of activation pulses, transformation of the image data Id into corresponding sequences $S_k$ of time slices of activation pulses, providing the time slices of activation pulses to the heating elements $H^n$ of the thermal head TH, and printing the image by transporting the thermographic material past and adjacent to the thermal head and by activating the heating elements $H^n$ of the thermal head. Herein, the transformation of the image data Id comprises a step of establishing a relation between output values $D_{kcm}$ or $D_{kcml}$ which are both continuous and monotone and in the latter case linear as well, and corresponding sequences $S_k$ of time slices $s_i$ of activation pulses.

8 Claims, 8 Drawing Sheets

METHOD FOR THERMAL PRINTING

The application claims the benefit of U.S. Provisional Application No. 60/269,965 filed Feb. 20, 2001.

DESCRIPTION

1. Field of the Invention

The present invention relates to a device operable for applying thermal energy to a recording medium, the device comprising a thermal head having energisable heating elements which are individually addressable. In particular, the recording medium is a thermographic material, and the head relates to thermal imaging, generally called thermography.

2. Background of the Invention

Thermal imaging or thermography is a recording process wherein images are generated by the use of imagewise modulated thermal energy. Thermography is concerned with materials which are not photosensitive, but are sensitive to heat or thermosensitive and wherein imagewise applied heat is sufficient to bring about a visible change in a thermosensitive imaging material, by a chemical or a physical process which changes the optical density.

Most of the direct thermographic recording materials are of the chemical type. On heating to a certain conversion temperature, an irreversible chemical reaction takes place and a coloured image is produced.

In direct thermal printing, the heating of the thermographic recording material may be originating from image signals which are converted to electric pulses and then through a driver circuit selectively transferred to a thermal print head. The thermal print head consists of microscopic heat resistor elements, which convert the electrical energy into heat via the Joule effect. The electric pulses thus converted into thermal signals manifest themselves as heat transferred to the surface of the thermographic material, e.g. paper, wherein the chemical reaction resulting in colour development takes place. This principle is described in "Handbook of Imaging Materials" (edited by Arthur S. Diamond—Diamond Research Corporation—Ventura, Calif., printed by Marcel Dekker, Inc. 270 Madison Avenue, New York, ed. 1991, p. 498–499).

A particular interesting direct thermal imaging element uses an organic silver salt in combination with a reducing agent. An image can be obtained with such a material because under influence of heat the silver salt is developed to metallic silver.

Referring to FIG. 1, there is shown a global principle schema of a thermal printing apparatus 10 that can be used in accordance with the present invention (known from e.g. EP 0 724 964, in the name of Agfa-Gevaert). This apparatus is capable of printing lines of pixels is (or picture elements) on a thermographic recording material m, comprising thermal imaging elements or (shortly) imaging elements, often symbolised by the letters Ie. As an imaging element Ie is part of a thermographic recording material m, both are indicated in the present specification by a common reference number 5. The thermographic recording material m comprises on a support a thermosensitive layer, and generally is in the form of a sheet. The imaging element 5 is mounted on a rotatable platen or drum 6, driven by a drive mechanism (not shown) which continuously advances (see arrow Y representing a so-called slow-scan direction) the drum 6 and the imaging element 5 past a stationary thermal print head 20. This head 20 presses the imaging element 5 against the drum 6 and receives the output of the driver circuits (not shown in FIG. 1 for the sake of greater clarity). The thermal print head 20 normally includes a plurality of heating elements equal in number to the number of pixels in the image data present in a line memory. The image wise heating of the heating element is performed on a line by line basis (along a so-called fast-scan direction X which generally is perpendicular to the slow-scan direction Y), the "line" may be horizontal or vertical depending on the configuration of the printer, with the heating resistors geometrically juxtaposed each along another and with gradual construction of the output density.

Each of these resistors is capable of being energised by heating pulses, the energy of which is controlled in accordance with the required density of the corresponding picture element. As the image input data have a higher value, the output energy increases and so the optical density of the hardcopy image 7 on the imaging element 5. On the contrary, lower density image data cause the heating energy to be decreased, giving a lighter picture 7.

In the present invention, the activation of the heating elements is preferably executed pulse wise and preferably by digital electronics. Some steps up to activation of said heating elements are illustrated in FIGS. 1 and 4. First, input image data 16 are applied to a processing unit 18. After processing and parallel to serial conversion (not shown) of the digital image signals, a stream of serial data of bits is shifted (via serial input line 21) into a shift register 25, thus representing the next line of data that is to be printed. Thereafter, under control of a latch enabling line 23, these bits are supplied in parallel to the associated inputs of a latch register 26. Once the bits of data from the shift register 25 are stored in the latch register 26, another line of bits can be sequentially clocked (see ref. nr. 22) into said shift register 25. A strobe signal 24 controls AND-gates 27 and feeds the data from latching register 26 to drivers 28, which are connected to heating elements 29. These drivers 28 (e.g. transistors) are selectively turned on by a control signal in order to let a current flow through their associated heating elements 29.

The recording head 20 is controlled so as to produce in each pixel the density value corresponding with the processed digital image signal value. In this way a thermal hard-copy 7 of the electrical image data is recorded. By varying the heat applied by each heating element to the carrier, a variable density image pixel is formed. A control algorithm must determine for every heating element the amount of energy which must be dissipated. In practice, the controller algorithm must deal with a variety of real-world problems:

Changing characteristics of the film media give different pixel sizes for the same nib (or heating element) energy, e.g. some examples:
  a different humidity in the emulsion layer, making its thermal capacity different,
  a different chemical composition of the image forming components.

Environmental characteristics like temperature and humidity may change:
  a temperature rise of the environment must be taken into account as the image forming temperature will not rise and is given by the chemical composition of the emulsion layer,
  humidity again changes the thermal capacity of the emulsion, producing different temperature rises when applying the same amount of energy.

The thermal process itself produces an excessive amount of heat which is not absorbed by the image forming media. This excessive heat is absorbed by a heat sink, but nevertheless, gives rise to temperature gradients internally in the head, giving offset temperatures in the nibs and between the several nibs. E.g. when the image forming process must have an accuracy of 1° C. in the image forming media, an increased offset temperature of 5° C. in the heat generating element must be taken into account when calculating the power to be applied to that element.

The heat generating elements are in the ideal case fully thermally isolated from each other. In practice, this is never the case and cross-talk exists between the several nibs. This cross-talk can be localised on several levels:
heat transfer between the several nibs in the thermal head structure itself,
heat transfer in the emulsion and film layer itself,
pixels are not printed one aside the other, but partly do overlap on the print media, mechanically mixing heat from one pixel with the other.

The electrical excitation of the nibs is mostly not on an isolated base. This means that not every nib resistor has its own electrical voltage supply which can be driven independent of all the other nibs. In general, some drive signals for driving the nibs are common to each other, this with the purpose of having reduced wiring and drive signals. In general, all nibs can be only switched on or off in the same time-frame. Producing different weighted excitations can only be achieved by dividing the excitation interval in several smaller intervals where for every interval, it can be decided if the individual nib has to be switched on or off. This process of "slicing" has its influence on the thermal image forming process. For example, a pattern excitation with the weights (128, 0, 0, 0, 0, 0, 0, 0) differs mathematically only 1 point from a pattern excitation with the weights (0, 64, 32, 16, 8, 4, 2, 1), but the pixelsize often will be much more different than just 1 point. It has been perceived that in some thermal heads, even a 'zero-excitation' or a 'no excitation' interval produces some heat in the nib as well. The controller must take this effect into account.

An empirical way of trying to solve the mentioned problem could comprise the steps of making a printout of all the available slices, measuring the density or pixel size on the pixel output, and deriving a relation between pixel output and the slices used. By simply using a conversion table one could build a continuous monotone and maybe even a linear relation between my table index and the pixel output.

However, such method is not feasible, because of several reasons, among which:
Only the large excitation times (or slices) will give a pixel output.
Also the smaller excitation times are important, as they are still used for compensations, even though no pixel output can be detected on the thermographic material.
Density measurement or pixel size measurement is not always error free, making the evaluation of the results difficult and asking more for a statistical evaluation of the results.
When making a printout, a temperature rise will occur in the printing device, which can jeopardise the whole measurement.

Although it is known to prepare both black-and-white and coloured half-tone images by the use of a thermal printing head, a need for an improved recording method still exists.

OBJECTS OF THE INVENTION

It is an object of the present invention to provide an improved method for recording an image on a thermal imaging element by means of a thermal head having energisable heating elements.

Other objects and advantages of the present invention will become clear from the detailed description and the drawings.

SUMMARY OF THE INVENTION

The above mentioned object is realised by a method for generating an image on a heat mode imaging element having the specific features defined in the independent claims. Specific features for preferred embodiments of the invention are disclosed in the dependent claims.

Further advantages and embodiments of the present invention will become apparent from the following description and drawings.

BRIEF DESCRIPTION OF THE DRAWINGS

The invention will be described hereinafter with reference to the accompanying drawings (not necessarily to scale), which are not intended to restrict the scope of the present invention.

Herein,

FIG. 2 shows a function f1(x) which is continuous in all points, but which is not continuous in point a;

DETAILED DESCRIPTION OF THE INVENTION

Figure 1:
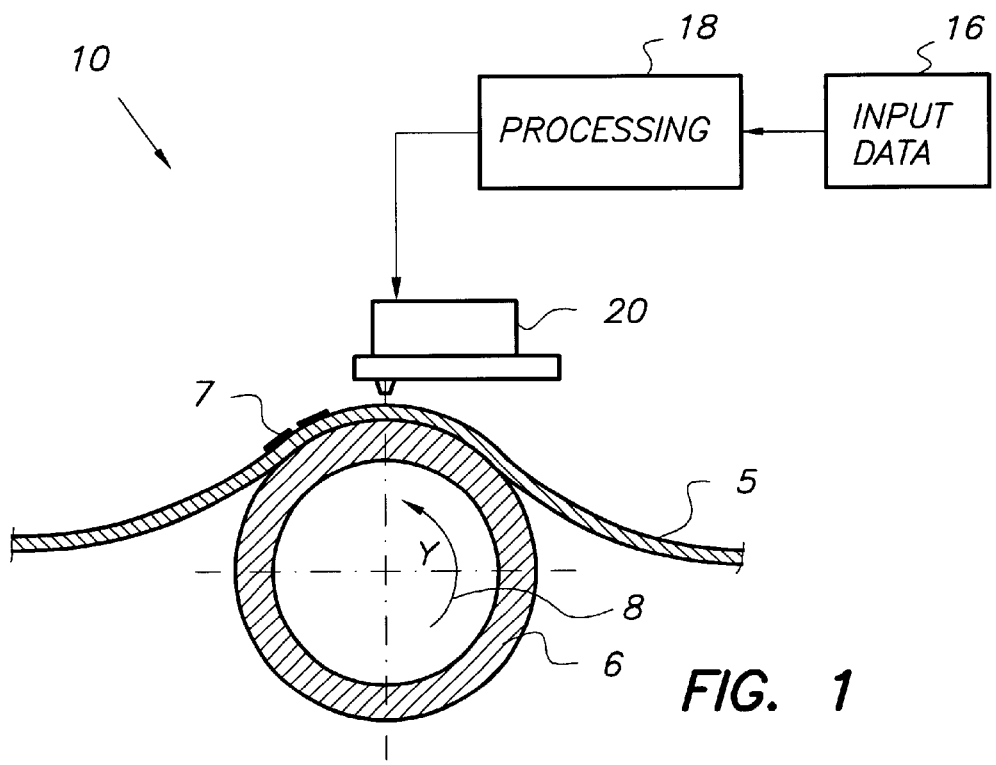
FIG. 1 shows some basic functions of a direct thermal printer.
Figure 2:
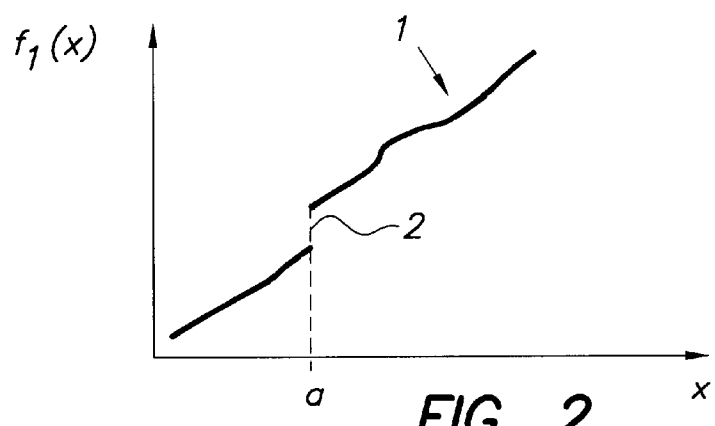
Figure 3:
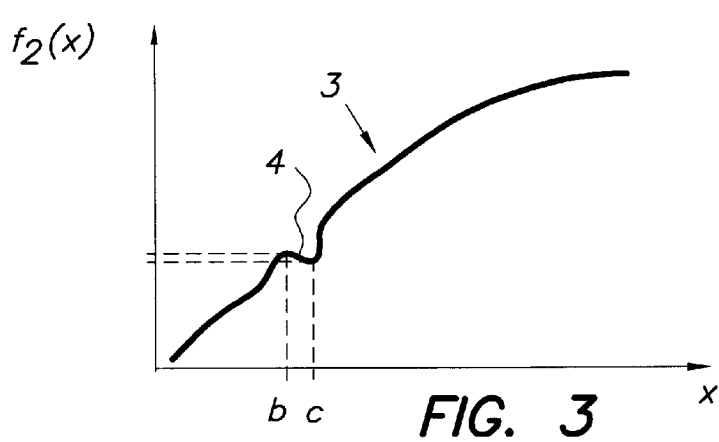
FIG. 3 shows a function f2(x) witch is continuous over the full region but not monotone in the region b-c.

The description given hereinafter mainly comprises seven sections, namely (i) terms and definitions used in the present application, (ii) general description of a preferred embodiment of a method for thermal printing according to the present invention, (iii) preferred embodiment of a method for thermal printing comprising an experimental building of a look-up table, (iv) further preferred embodiment of a method for thermal printing according to the present invention, (v)illustration of the invention with practical examples, (vi) further preferred embodiments according to the present invention, and (vii) further applicability of a method according to the present invention.

While the present invention will hereinafter be described in connection with preferred embodiments thereof, it will be understood that it is not intended to limit the invention to those embodiments.

(i) Explanation of Terms Used in the Present Description

For the sake of clarity, the meaning of some specific terms applying to the specification and to the claims are explained before use. Most of these terms are explained in this section, some more specific terms [e.g. $a_i^k$ or u(t, $t_{start}$, $\Delta t$) or $p_{HE}(t)|_{S_k}$] will be explained in the appropriate paragraphs (e.g. while explaining equation 5).

An "original" is any hardcopy or softcopy containing information as an image in the form of variations in optical density, transmission, or opacity. Each original is composed of a number of picture elements, so-called "pixels". Further, in the present application, the terms pixel and dot are regarded as equivalent.

Furthermore, according to the present invention, the terms pixel and dot may relate to an input image (known as original) as well as to an output image (in softcopy or in hardcopy, e.g. known as print).

The term "thermographic material" (being a thermographic recording material, hereinafter indicated by symbol m) comprises both a thermosensitive imaging material and a photothermographic imaging material (being a photosensitive thermally developable photographic material).

For the purposes of the present specification, a "thermographic imaging element" Ie is a part of a thermographic material m (both being indicated by ref. nr. 3).

Hence, symbolically: m→Ie.

By analogy, a thermographic imaging element Ie, comprises both a (direct or indirect) thermal imaging element and a photo-thermographic imaging element. In the present application the term thermographic imaging element Ie will mostly be shortened to the term imaging element.

By the term "heating material" (hereinafter indicated by symbol hm) is meant a layer of material which is electrically conductive so that heat is generated when it is activated by an electrical power supply.

In the present specification, a heating element $H^n$ is a part of the heating material hm.

Hence, symbolically: hm→$H^n$.

A "heating element $H^n$" (as e.g. $H^1$, $H^2$, $H^3$ . . . ; sometimes also indicated as "nib") being a part of the heating material hm is conventionally a rectangular or square portion defined by the geometry of suitable electrodes.

A "platen" comprises any means for firmly pushing a thermographic material against a heating material e.g. a drum or a roller).

According to the present specification, a heating element is also part of a "thermal printing system", which system further comprises a power supply, a data capture unit, a processor, a switching matrix, leads, etc.

The index 'n' is used as an superscript with regard to nib numbers, n=0, 1, . . . , $N_{nibs}$–1 with $N_{nibs}$ the total number of nibs on the thermal head.

The term "controllability" of a thermal printing system denotes the ability to precisely control the output of a pixel, independent from the position of the pixel and the presence of pixel neighbours.

A "heat diffusion process" is a process of transfer of thermal energy (by diffusion) in solid materials.

A "heat diffusion partial differential equation PDE" is a partial differential equation describing a heat diffusion process in a solid material.

A "specific heat production $q'''$" is a volumetric specific thermal power generation in the confined bulk of the thermographic material [W/m³]. When reference is made to a sequence $S_k$ defining the power distribution, $q_k''$ will be used.

A "specific mass ρ" is a physical property of a material and means mass per volumetric unit [kg/m³].

A specific heat c means a coefficient c describing a thermal energy per unit of mass and per unit of temperature in a solid material at a temperature T [J/kg.K].

A "thermal conductivity λ" is a coefficient describing the ability of a solid material to conduct heat, as defined by Fourrier's law $$q = -\lambda \cdot \frac{dT}{dx};$$

λ is expressed e.g. in [W/(m.K)].

A "transient temperature history" $Th^n$=f(x, y, z, t), or short $Th^n$, denotes the temperature history in the thermographic material in every point x, y, z at pixel n and at the instance of time t (t being relative to the start time of the heating element activation). $Th_k^n$ or $Th_k$ refers to a sequence $S_k$ or power distribution $P_k$ used as a template for driving the heating element.

$Dh_k$ will be denoted as a calculated quantity from a theoretical background and being representative for the considered pixel output $D_k$ for a given temperature history $Th_k$ in the image forming material.

GS denotes a set of $Dh_k$ values found by calculating the pixel output for each given excitation $S_k$ or $P_k$, GS={($S_1$, $Dh_1$), ($S_2$, $Dh_2$), ($S_3$, $Dh_3$), . . . } or GS={($P_1$, $Dh_1$), ($P_2$, $Dh_2$), ($P_3$, $Dh_3$), . . . }.

GS' and GS" each denote an ordered subset from GS that imposes a mathematical relationship on the $Dh_k$ values.

An "activation pulse" is an energy pulse supplied to a heating element, described by a certain energy given during a defined time interval ts.

The elementary time interval ts during which a strobe signal is active is often called a "time slice".

The term "time slice $s_i$ of activation pulses" explicitly indicates that during a time slice, and hence during a same strobe signal, the individual heating elements may be individually and independently activated or non activated by corresponding activation pulses.

The "index i" is used to denote a slice number, i=0, 1, ..., N−1, with N being the total number of slices.

A time slice ts may be written as $$ts = tScale * w \qquad \text{Equation 1}$$

wherein w is the weight of the slice and wherein $t_{Scale}$ is a scaling factor which is the same for all slices.

The term "weight w of a slice" indicates a relative relationship among the time slices used. The smallest slice weight is mostly taken as being 1.

The term "binary weights" refers to a set of weights wherein the increase in magnitude is a power of 2, symbolically $w_i = 2^j$, wherein $j \in \{0, 1, 2, \ldots, i, \ldots, N-1\}$ and each number picked only once.

Figure 9:
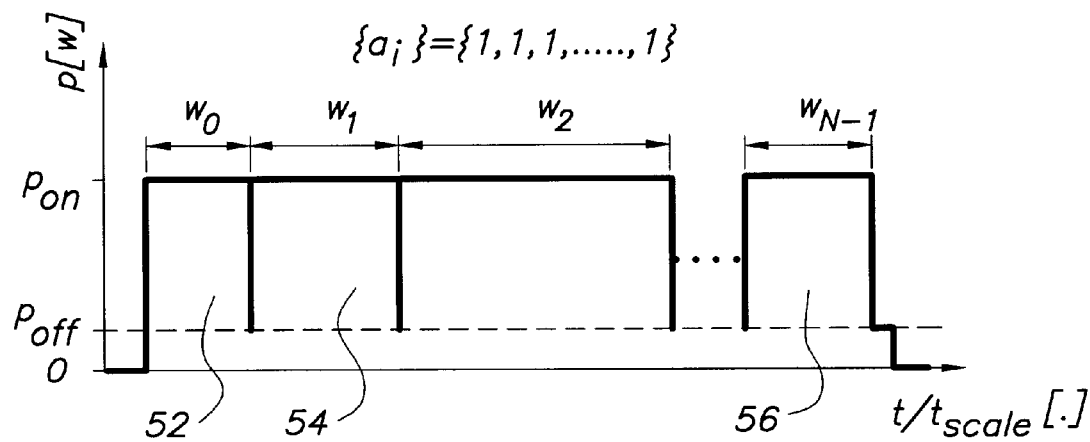
FIG. 9 shows the power applied to a heating element for a sequence with maximum weight.
Figure 10:
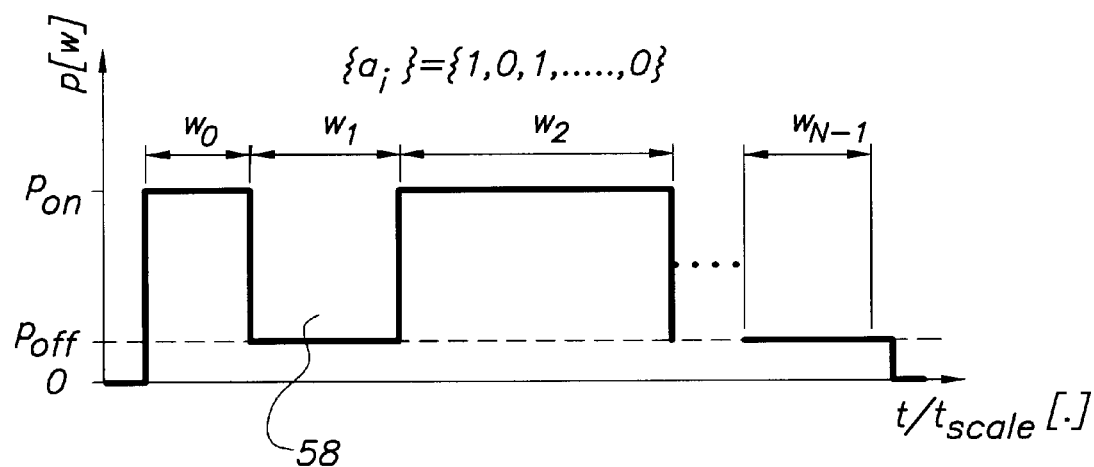
FIG. 10 shows the heating element power supply for a sequence $\{1, 0, 1, \ldots, 0\}$.

A "sequence $S_k$" means a combination of time slices with a particular order and each with a particular weight or pulse length ts that can be different for each time slice (as is illustrated e.g. in FIGS. 9 and 10).

The "index k" is used to denote sequences of slices, k=0, 1, ..., K−1, with K the total number of possible sequences or the total number of possible combinations of slices.

The "weight $W_k$" of a sequence $S_k$ is the sum of the weights of the active slices in that sequence.

The total excitation time $t_k^n$ for a nib n due to a sequence Sk equals $t_k^n = t_{Scale} * W_k$.

The term "sequence $S_k$ of time slices $s_i$ having (different) binary weights $w_i$" comprises a collection of time slices using a binary weighting scheme, wherein $ts_i$ is different for each slice i and $ts_i = t_{Scale} * 2^j$, j being associated with slice number i but not necessarily applied in numerical order or $j \in \{0, 1, 2, \ldots, i, \ldots, N-1\}$ and each number picked only once.

The term power distribution $P_k$ or $P_k(t)$ is denoted for a time dependent power cycle applied to a heating element during a line time and is more general than a sequence of slices, mostly supplying the heating element with a constant voltage. $P_k$ is a more general formulation of a heating element excitation, the index k referring to a number identifying the power distribution, k=0, 1, ..., K−1.

In the present application, a "pixel output D" or shortly an "output D" comprises a quantification of a pixel printed on a recording material, said quantification possibly relating to characteristics as density, size, etc. The pixel output of nib n is denoted $D^n$ and the pixel output for a particular sequence $S_k$ or power distribution $P_k$ is denoted $D_k$.

A "continuous output" means an output showing a continuous output for a continuous rising of the input to the system.

The term "continuous" has to be interpreted in a mathematical sense. Therefor, for a function f(x), it applies for every co-ordinate that $$f(a) = \lim_{x \to a^+} f(x) = \lim_{x \to a^-} f(x). \qquad \text{Equation 2:}$$

A "monotone output" means an output showing a monotone output for a monotone rising of the input to the system. [In the context of this patent, the input preferably is the index of a table LUT, representing in fact the input to a virtual printing device, making abstraction of the time slice details.]

The term "monotonous" can mathematically be written as:

$$\forall x, y \in \Re, \text{ if } x > y \to f(x) > f(y). \qquad \text{Equation 3}$$

The acronym "$D_k$" represents a set of outputs with no particular ordering or relation between the elements with regard to the index k.

The acronym "$D_{kcm}$" represents a set of ordered pixel outputs with an order being defined by a mathematical relationship between the elements, in this case imposing continuity and monotony with regard to the index k.

The function $F_{cm}(k)$ denotes a function being continuous and monotone with regard to the input k. It is an application defined curve and can take whatever mathematical form, as long as it is continuous and monotone.

The acronym "$D_{kcml}$" represents a set of ordered pixel outputs with an order being defined by a mathematical relationship between the elements, in this case imposing continuity, monotony and linearity with regard to the index k, or $D_{kcml} = (r_1 * k) + r_2$, wherein $r_1$ and $r_2$ are real numbers.

The function $F_{cml}(k)$ is a function being continuous, monotone and linear with regard to the index k. It is an application defined curve in the form $F_{cml}(k) = (r_1 * k) + r_2$, wherein $r_1$ and $r_2$ are real numbers.

An output $D_k$ is related to a sequence $S_k$. Mathematically a formal notation can be used, $D_k = F(S_k)$, implying that a relation exists between a sequence $S_k$ of slices of activation pulses and a pixel output $D_k$.

A lookup table LUT1 can be defined that relates a certain index number k to a certain pixel output $D_k$ or $Dh_k$ in a first entry and in a second entry the sequence $S_k$ or the power distribution $P_k$ to be used. Based on LUT1, a relation can be established between the index k of the LUT and a pixel output $D_k$ (or $Dh_k$), further related to a sequence $S_k$ or power distribution $P_k$, to be used in the printing process. No particular mathematical relationship is necessary between the index k of the table and the numerical value of $D_k$ or $Dh_k$. It is a numerical representation of the set GS.

| Index | Wanted pixel output | Excitation sequence |
|---|---|---|
| 1 | $D_1$ or $Dh_1$ | $S_1$ or $P_1$ |
| 2 | $D_2$ or $Dh_2$ | $S_2$ or $P_2$ |
| k | $D_k$ or $Dh_K$ | $S_k$ or $P_k$ |

A lookup table LUT2 can be defined that relates a wanted pixel output $D_{kcm}$ or $Dh_{kcm}$ to a sequence $S_k$ or power distribution $P_k$ to use. Furthermore, with regard to the index k of the table, the $D_{kcm}$ or $Dh_{kcm}$ values will be a continuous and monotone set of numbers. LUT2 is the numerical presentation of the set GS'.

A lookup table LUT3 can be defined that relates a wanted pixel output $D_{kcml}$ or $Dh_{kcml}$ to a sequence $S_k$, or a predefined time dependent power distribution $P_k$ to use. Furthermore, with regard to the index k of the table, the $D_{kcml}$ or $Dh_{kcml}$ values will have a continuous, monotone and linear relationship with the index k. LUT3 is the numerical presentation of the set GS".

A vector of slice weights will be denoted by $\{w_0, w_1, w_2, \ldots, w_N\}$ with $w_0$ the weight used for the first slice, $w_1$ for the second slice etc. . . .

As mentioned before, some more specific terms [e.g. $a_i^k$ or $u(t, t_{start}, \Delta t)$ or $P_{HE}(t)|_{S_k}$] will be explained in the appropriate paragraphs.

It is known, and put to intensive commercial use (e.g. Drystar™, of Agfa-Gevaert), to prepare both black-and-white and coloured half-tone images by the use of a thermal printing head, a heat-sensitive material (in case of so-called one-sheet thermal printing) or a combination of a heat-sensitive donor material and a receiving (or acceptor) material (in case of so-called two-sheet thermal printing), and a transport device which moves the receiving material or the donor-acceptor combination relative to the thermal printing head. In the next paragraphs, a working method according to the present invention will be explained in full depth.

(ii) General Description of a Preferred Embodiment of a Method for Thermal Printing According to the Present Invention According to the present invention, a method for printing an image using a thermal printing system comprises a thermal printer 10 having a thermal head TH (ref. nr. 20) incorporating a plurality of energisable heating elements $H^n$ (29) and a thermographic material m (5), said method comprising the steps of supplying image data Id (see ref. nr. 16) corresponding to a plurality of output values $D_k$ to a processing unit 18 of said thermal printer, reading a first table LUT1 comprising first entries for desired output values $D_k$ and second entries for sequences $S_k$ of time slices $s_i$ of activation pulses, transformation of said image data Id into corresponding sequences $S_k$ of time slices of activation pulses, providing said time slices of activation pulses to said heating elements $H^n$ of said thermal head TH, printing said image by transporting (see ref. nr. 8 and arrow Y) said thermographic material past and adjacent to said thermal head and by activating (see ref. nr. 30) said heating elements $H^n$ of said thermal head, wherein said transformation of said image data Id comprises a step of establishing a relation between output values $D_{k_{cm}}$ which are both continuous and monotone, and corresponding sequences $S_k$ of time slices $s_i$ of activation pulses.

In the following paragraphs, each of these method-steps will be described in full detail.

The step of supplying image data $I_d$ corresponding to a plurality of output values $D_k$ to a processing unit of said thermal printer has already been indicated before in relation to the description of FIG. 1, in particular w.r.t. input data block 16. Here, for sake of good understanding the present invention, some further informations are explained with regard to FIGS. 7, 8, 9, 10 and 11.

Figure 7:
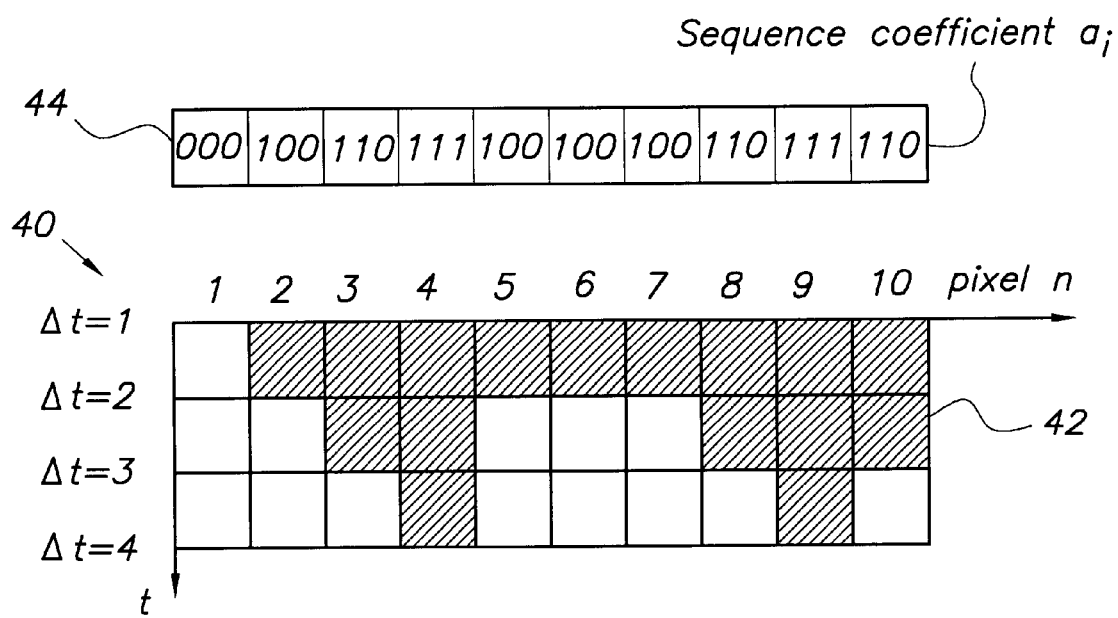
FIG. 7 is a graph illustrating a parallel to serial conversion.

First, we refer to FIG. 7 which is a graph illustrating a parallel to serial conversion. Knowing that the thermal head normally includes a plurality of heating elements equal in number to the number of pixels in the data present in the line memory and that each of the heating elements is capable of being energised by heating pulses, the number of which is controlled in accordance with the required density of the corresponding picture element, FIG. 7 illustrates the conversion of a ten-head-row subjected to image data of bytes consisting of two bits, and thus representing maximally four densities (image data '00' gives a printing sequence {000}, '01' gives {100}, '10' gives {110} and '11' gives {111}). Herein, following referral numbers are used: 40 is a schematic for a parallel to serial conversion, 42 is schematic for serial outputs, and 44 is a schematic for parallel inputs. It follows that the thermal head applied with a recording pulse causes current to flow through the heating elements for corresponding "ones" (cf. input data indicative of "black picture elements") of.

Figure 8:
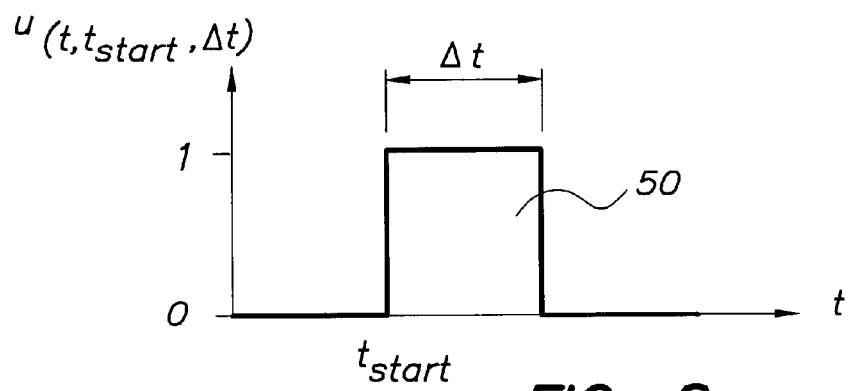
FIG. 8 shows a graphical representation of the function $u(t, t_{start}, \Delta t)$.

FIG. 8 is the basic function used to describe the strobe signal 50 applied to the electronics (by means of strobe line 24), being active during a limited time Δt starting from $t=t_{start}$. During a line time, N strobe pulses will be successively applied to the system, where Δt can be different for each strobe pulse (as is illustrated e.g. in FIGS. 9 and 10).

We will denote the word slice to each sequence where the strobe pulse is active. During a single time slice, the power applied to a heating element preferably will be fixed.

FIG. 9 shows the power applied to a heating element for a sequence with maximum weight, and describes a sequence of N successive strobe pulses applied to the heating element during a line time. In this case, during each slice, the heating element will get a power $P_{on}$. The power sequence applied to the heating element can be represented by a sequence of numbers $\{a_i\}$ that represent the power state applied to the heating element during each slice, '1' being $P_{on}$ and '0' being $P_{off}$ applied to the heating element. For the depicted example, all $a_i$-values are '1' or $\{a_i\}=\{1,1,1,\ldots,1\}$. When N slices have been given, the power to the heating elements is switched off. For sake of clarity, it is indicated that ref. nr. 52 is a time slice having a weight $w_0$ and being in an "on-state", 54 is a time slice having a weight $w_1$ and being in an "on-state", and 56 is a time slice having a weight $w_{N_{nibs}-1}$ and being in an "on-state".

FIG. 10 shows the heating element power supply for a sequence $\{1, 0, 1, \ldots, 0\}$, and hence describes a sequence of N slices with only $P_{on}$ applied in the first and third slice and $P_{off}$ during all the other slices. This can be represented by $\{a_i\}=\{1, 0, 1, 0, 0, \ldots, 0\}$. Ref. nr. 58 represents a time slice having a weight $w_1$ and being in an "off-state".

Figure 11:
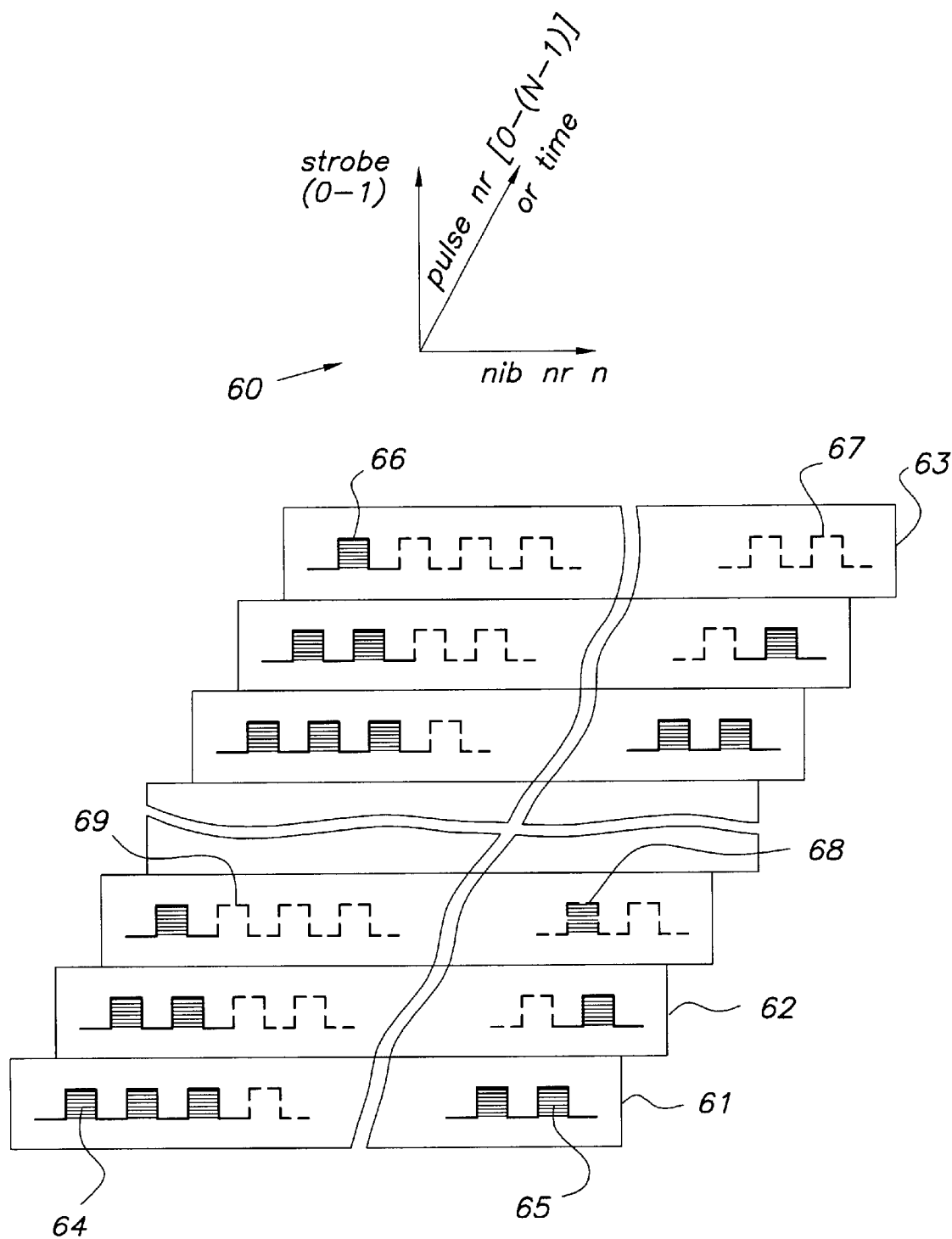
FIG. 11 is a chart illustrating for all heating elements the activating heating pulses with an exemplary duty-cycle and with an exemplary skipping, known from prior art.

FIG. 11 is a 3D-chart 60 illustrating strobe pulses with an exemplary but fixed duty-cycle and with an exemplary skipping) for all heating elements (up to nib nr n), as known from prior art. In FIG. 11, skipped pulses are indicated by dotted lines and following referral numbers are used: 61 represents a first time slice for all nibs, 62 is second time slice, 63 is a last time slice, 64 is a first activation pulse for a first nib 0, 65 is a first activation pulse for a last nib $N_{nibs}-1$, 66 is the last activation pulse for first nib 0, 67 is the last activation pulse (and being skipped) for last nib $N_{nibs}-1$, 68 is an active activation pulse ('1') applied to the last-but-one nib $N_{nibs}-2$ during the third slice, 69 is a skipped activation pulse or powerless activation pulse ('0') applied during the third time slice.

The method step of reading a first table LUT1 comprising first entries for desired output values $D_k$ and second entries for sequences $S_k$ of time slices $s_i$ of activation pulses, will be disclosed hereinafter.

The technique of reading a table, e.g. a look-up-table, comprising first entries and second entries, is generally well known to people skilled in the art and hence, does not need further explanation. In this particular table LUT1, the first entries relate to desired output values $D_k$, and the second entries relate to sequences $S_k$ of time slices $s_i$ of activation pulses. The terms 'sequences $S_k$ of time slices $s_i$ of activation pulses' have already been indicated in foregoing section (i) related to "terms and definitions" but still will be explained more thoroughly in the next paragraphs.

Figure 4:
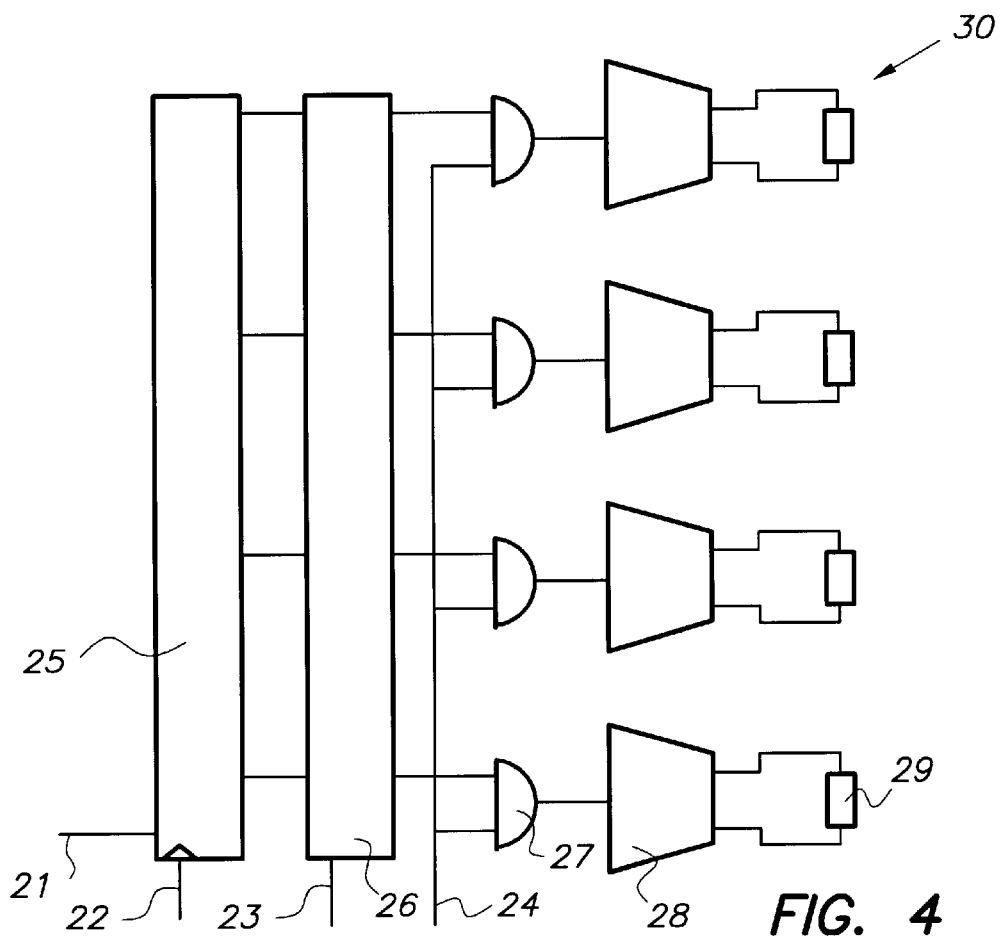
FIG. 4 shows a control circuitry in a thermal print head comprising resistive heating elements.

In order to be as clear as possible, first attention is focused on the electric driving of the individual heating elements which is based on the schematic shown in FIG. 4. Essential is the presence of a STROBE signal 24 which is common for a whole series of heating elements 29 and which allows a common on- or off-switching of all heating elements.

In order to be able to give the heating elements 29 a different electrical energy (e.g. because of compensation reasons), and taking into account that several electrical signals are common to all heating elements, a so-called "time slicing" or shortly "slicing" is performed. Said slicing comprises a dividing of the total excitation period in shorter individual time periods or "slices" and selectively activating heating elements during each time slice (by means of AND-gates ref. nr. 27).

More in particular, the total excitation time is divided into small time slices, and the total activation time of a heating element is then produced by turning the heating element on or off in some of those slice intervals. Pure arithmetically, a total excitation time equals the summation of the on-times of the different slices and is in the end nearly equal to the desired excitation time for the heating element. So, slices with weights of e.g. 1, 2, 4, 8, 16, 32, 64, 128 allow to make any random weight between 0 to 255.

The step of transforming said image data Id into corresponding sequences $S_k$ of time slices of activation pulses, may be explained by the following.

As mentioned before, each of the heating elements is capable of being energised by activation pulses, the energy of which is controlled in accordance with the required output value (e.g. density, or pixel size) of the corresponding pixel.

When image data have a relatively high value, the corresponding output energy is also relatively high, and so is e.g. the optical density of the hardcopy image 7 on the thermographic material 5. On the contrary, lower density image data cause the heating energy to be decreased, giving a lighter picture 7.

The output energy $E_{nib}$ dissipated in a heating element switched on during a time $t_{on}$ is representative for the final temperature in the thermographic material m and equals in its most simply form for a resistive heating element 29:

$$E_{nib} = \frac{V_{pow}^2}{Rh_{heaterelement}} t_{on} \qquad \text{Equation 4:}$$

Herein, the term $V_{pow}$ represents the voltage applied to the heating element during an on-time, $Rh_{heaterelement}$ the equivalent macroscopic resistance measured between the terminals supplying the heating element, $t_{on}$ represents the sum of the time slices where the heating element was switched on.

The step of providing said time slices of activation pulses to said heating elements $H^n$ of said thermal head TH needs no further explanation, as it is well known by people skilled in the art.

For a same reason, also the step of printing said image by transporting said thermographic material past and adjacent to said thermal head (comprising so-called fast scan movement X and a slow scan movement Y), and by activating said heating elements $H^n$ of said thermal head, needs no further explanation.

Now an important characteric will be explained, in particular the characteristic wherein said transformation of said image data Id comprises a step of establishing a relation between output values $D_{kcm}$ which are both continuous and monotone, and corresponding sequences $S_k$ of time slices $s_i$ of activation pulses.

According to the present invention, we have found that the output D, especially $D_{kcm}$, is dependent from the time history of activation, in particular dependent from the history of time slices $s_i$ of activation pulses, and more in particular dependent from the sequences $S_k$ of time slices $s_i$ of activation pulses.

Figure 12:
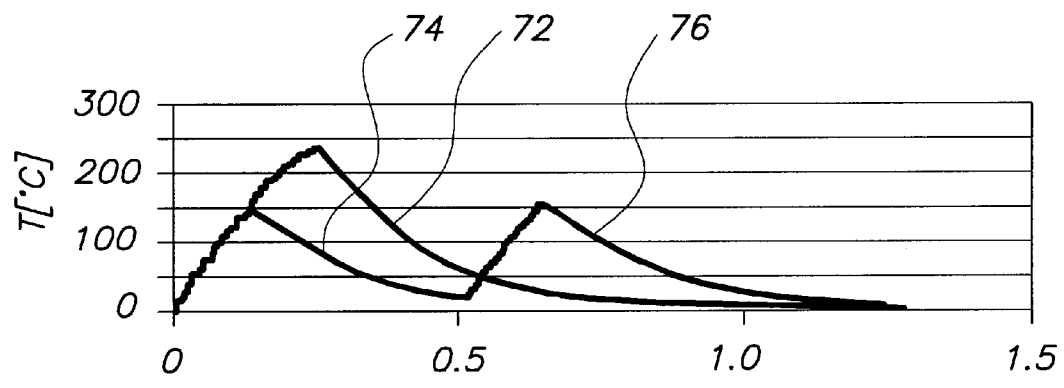
FIG. 12 shows different temperature rises in a heating element for two equal energy excitations.

In simple language, it is said that time history is an important parameter in the present invention, as it is dealing with the transfer of thermal energy from inside the heating element towards the thermographic material. Temperature behaves as a non-linear function of time. For example, if 1 mJ heat is produced in the heating element, followed by a 300 μs wait period and then again a 1 mJ heat production, this will have a different thermal effect on the thermographic material as giving a single 2 mJ single heat pulse. In the former case, most of the heat of the first 1 mJ pulse will have vanished before the influence of the second heat pulse can be noticed. A calculated example is shown in FIG. 12. Although equal energy has been given to the heating element, the sequence of giving this energy is different and this gives a different history of the temperature. When giving the energy in a single pulse (ref. nr. 72), a much higher temperature is reached, giving in practice a more pronounced pixel output than the split energy scheme (ref. nrs. 74, 76).

In a more mathematical wording, it can be said that a general expression of the time dependent power applied to the heating element using a time slice system:

$$(p_{HE}(t))|_{S_k} = \sum_{i=0}^{N-1} u(t, t_{start}^i, w_i \cdot t_{Scale})(a_i^k P_{on} + (1 - a_i^k) P_{off}) \qquad \text{Equation 5:}$$

For sake of easy reading, the abovementioned nomenclature (see section i) further comprises:

$P_{HE}(t)|_{S_k}$ the time dependent power applied to a heating element when using a sequence $S_k$, $P_{on}$ is the power dissipated in a heating element when it is active driven, $P_{off}$ the power dissipated in the heating element when it is switched off during an active write period, i.e. an active STROBE pulse, $u(t, t_{start}, \Delta t)$ a function that is '1' starting from the time $t_{start}$ during a time $\Delta t$ (see FIG. 8), $t_{start}^i$ the active starting time of the i'th slice, $w_i$ is the weight of a slice $s_i$, N is the number of slices, i is a summation index (over all time slices)

$a_i^k$ is a sequence coefficient having only the values of 0 or 1 and defines whether the heating element is on (1) or off (0) during the slice i, the index k referring to the index of the sequence $S_k$, the $a_i^k$ values, together with the order in which they appear will be called a sequence $S_k$ and are therefore closely linked to the defined slices, $S_k = \{a_0^k, a_1^k, \ldots, a_{N-1}^k\}$, a slice is a time span $ts_i$ having an heating element activation time defined by $ts_i = w_i * t_{Scale}$.

For an image forming process using a slicing method, the total excitation time of a heating element is distributed over a large time period. During some slices, a heating element will have $a_i$ equal to zero, making it cool down during that period. For some thermal heads, it is also possible that an $a_i$ value of zero, still gives some limited power excitation in the heating element itself during an active slice period.

Now we have found that the output $D_k$, especially $D_{kcm}$ is not only dependent from the energy of activation, but in particular dependent from the time slices $s_i$ of activation pulses, and more in particular dependent from the sequences $S_k$ of time slices $s_i$ of activation pulses. So it may be that the application of a energy $E_1$ to a particular heating element $H^n$ of a sequence $S_1$ of time slices $s_{i1}$ of activation pulses results in a different output as compared to the application of an equal energy $E_2 = E_1$ to the same heating element $H^n$ of another sequence $S_2$ of time slices $S_{i2}$ of activation pulses.

During each slice period i, the heating elements will be STROBE active during a time $ts_i = w_i * t_{Scale}$ and depending on the value of $a_i$, the heating element will be put on or off. In this manner, random values of $t^n$ can be realised by choosing a smart vector of time weights, a sufficient number of slices N and a correct time scaling factor $t_{Scale}$. It is important to understand that a same excitation time $t^n$ can be made in different ways, as it is always possible to change the order of the successive slices, giving in total N! combinations.

If we call $t^n$ the time that the heating element n must be excited by electrical power, then we have for printing a line, a whole vector $\{t^n\}$ with different $t^n$ values for the several heating elements, representing the image data. A well known way of slice weights is e.g. a binary series, having the weights $\{1, 2, 4, 8, 16, 32, 64, \ldots \}$. Depending on the maximum value of $t^n$ and the sum of all the weights, the correct scaling factor $t_{Scale}$ can be chosen.

When using a sequence of slices, it is often assumed that the pixel output shows a continuous and monotone "pixel output" (e.g. visual density or pixel size) in accordance with the used excitation weight $W_k$, being representative for the integrated power over all slices of the sequence, and in case of a constant voltage excitation, linear with the total on-time $t_k^n = W_k * t_{Scale}$. In practice, the time dependent character of the power distribution applied to the heating element, has a substantial influence on the pixel output produced. When using a series of sequences with slices where the summed excitation time ($t_k^n$) increases continuously, often a non-monotone pixel appearance (e.g. density of pixel size) will result.

In practice, a method according to the present invention calculates the temperature response for all the available sequences. Then, based on the calculated pixel output, one determines slice sequences out of the pool of available sequences and builds a set of sequences giving a continuous, monotone —and maybe even linear—pixel output when applied to the head. This data are put in a table, having as input a desired pixel size or density, and as output a sequence describing a slice based power distribution to be applied to the heating element.

(iii) Preferred Embodiment of a Method for Thermal Printing Comprising an Experimental Building of a Look-Up Table First, it is important to know that a small heating element on top of a substrate produces the heat for interacting with a thermographic material. Only a small part of the heat will flow towards the thermographic material, the rest are losses which will flow through the substrate to a heatsink structure, kept at a low temperature by means of cooling techniques.

Second, it is also important to know that different heating elements on a same thermal head generally get different amounts of energy during a same print cycle, because of several possible reasons which are not explained here because of conciseness. In a practical experiment, a periodic line pattern has been printed on a thermographic material with an increasing value of the energy sent to the heating elements according to the above mentioned total on-time $t^n$ of the heating element n. The weights used where $\{1, 2, 4, 8, 16, 32, 64\}$. By means of a macro densitometer, the density of the periodic line pattern has been recorded, as this is sufficiently representative for the line thickness.

Figure 13:
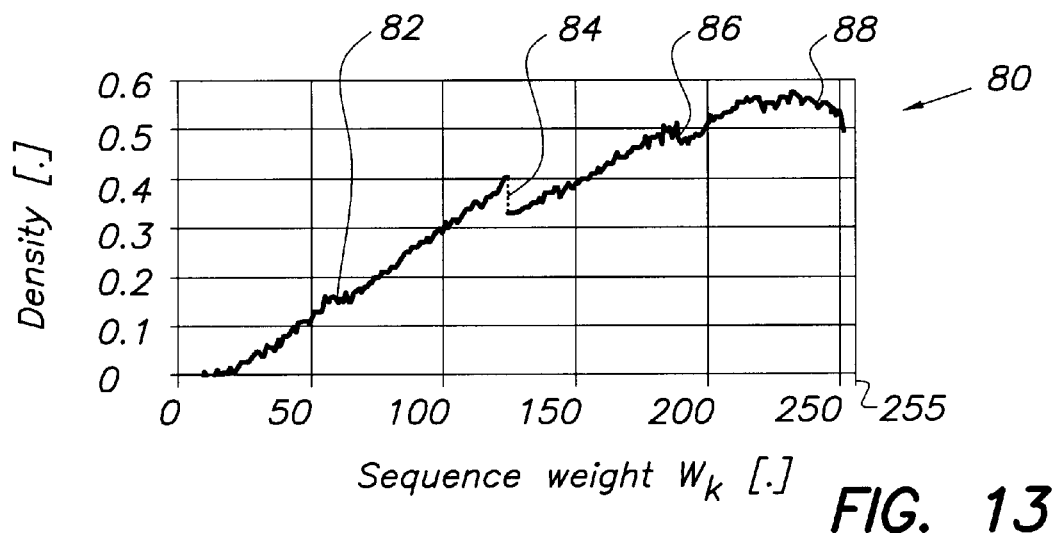
FIG. 13 shows a macro density of a line pattern as a function of an increased electrical excitation for binary weighted time slices, as suitable in a method according to the present invention.

Here, reference is made to FIG. 13 showing a macro density of a line pattern as a function of an increased electrical excitation time for binary weighted time slices. Herein, 80 represents a density curve relating to sequence weights $W_k$, 82 a non linearity in density at a sequence weight of 64, ref. nr. 84 a jump in density at a sequence weight of 128, ref. nr. 86 a jump in density at a sequence weight of 196, and ref. nr. 88 represents a saturation in density.

FIG. 13 shows clearly that for some weight transitions (cf. x-axis giving $W_k$ of sequence), important changes in the pixel output exist. An important jump in the weight distribution $W_k$ over time occurs at 128, 196, 64.

These jumps can be removed by using a lookup table and using the concept of sequences $S_k$. The input of such table is a virtual excitation and is representative for the output result from the controller. The output of the table is a sequence $S_k$ that actually has to be used for driving the heating element. The values in the table can be picked on an experimental base by making pixel output examples and then choosing those sequences $S_k$ so that a continuous and monotone result is obtained. As an example, taking FIG. 13, the first 128 values of our table could be the values from 1 to 128, as these weights give an acceptable continuous and monotone output. Entry number 129 should not have weight 129, as this gives a major drop in our pixel output (e.g. density drops from 0.4 to 0.33). The first weight having a density a little higher than 0.4 is about weight 155. So, this becomes the value in the lookup table at entry number 129. For this example, it is possible that one would not be able to construct a table with 255 different "greyvalues", but somewhat less.

Nevertheless, when applying the above method for a practical thermal head on a certain thermographic material, some problems do arise making the construction of the lookup table very difficult. In general, the experimental way to make a lookup table is possible but is expensive because of the many experiments that have to be done under well controlled conditions.

(iv) Detailed Description of a Further Preferred Embodiment of a Method for Thermal Printing According to the Present Invention For sake of good understanding, first some general introduction is given relative to this preferred embodiment.

Concerning the image forming process, it is assumed that a model or calculation scheme is known, giving e.g. a relation between the temperature history in a point of the thermographic material and its corresponding pixel output expressed e.g. in a density variation or corresponding pixel size. This model includes the time dependency of the heat applied to the thermographic material.

In case the correct details of this formulation are not known exactly, a simple linear relation may be taken, e.g. pixel size varying linearly with peak temperature in the thermographic material. The exact values of this relation are not important, only the relative behaviour is important, as the most important thing is to get a continuous monotone relation between excitation weight and pixel output.

More in particular, the invention consists of making a finite-element-model FEM or a finite-difference-model FD calculation scheme for the head, including heatsink at a constant temperature, isolation layers, heating element, protective layer, thermographic material and the material pressing the film against the thermal nib line (mostly rubber). Using the known way in which the heating element is excited for the given sequence of slices, a transient simulation is made of the thermal partial differential equations PDE governing the thermal system. This simulation gives as output the history of the temperature in the thermographic material. Once the temperature is known, the response of the pixel output can be found for the given power distribution applied to the heating element, defined by the sequence $S_k$ of slices.

In a further preferred embodiment of a method for thermal printing according to the present invention, said step of establishing a relation between output values $D_{kcm}$ which are both continuous and monotone, and corresponding sequences $S_k$ consisting of time slices $s_i$ of activation pulses, comprises the following substeps:

- building a calculation scheme representative for said thermal printing system, said model taking into account thermal characteristics of said thermal head TH, thermal characteristics of said thermographic material m, thermal characteristics of a platen and specific heat productions $q_k$ as imposed by sequences $S_k$ of said time slices $s_i$ having different binary weights $w_i$;
- calculating transient temperature histories $Th_k$ in said thermographic material m at nib n for said sequences $S_k$ of time slices $s_i$ having different weights $w_i$ (e.g. binary weights);
- establishing a relationship between said transient temperature histories $Th_k$ and said output values $Dh_k$;
- storing first entries for continuous and monotone output values $Dh_{kcm}$ and second entries for corresponding sequences $S_k$ into a second table LUT2.

In the following paragraphs, each of these method-steps will be described in full detail.

The step reading 'building a calculation scheme representative for said thermal printing system, said model taking into account thermal characteristics of said thermal head TH, thermal characteristics of said thermographic material m, thermal characteristics of a platen and specific heat productions $q_k^n$ in nib n as imposed by sequences $S_k$ of said time slices $s_i$ having different weights $w_i$, now will be described immediately.

A thermal calculation scheme simulates how the heat is transferred from the heating element to a point inside the thermal sensitive material. This is a transient simulation, using a precise image of the time dependent heat generated inside the heating element, which is fully defined by the used sequence $S_k$. For most thermal heads (e.g. thick film or thin film heads), a one-dimensional model 1D will be sufficiently accurate for making the calculation. As transient simulations need to be performed for all different sequences, the smaller the model (e.g. 1D simulations), the more beneficial it is with regard to the calculation time.

All materials need to be defined by their correct parameters, being thermal conductivity $\lambda$[W/mK], specific heat c [J/m$^3$], and specific mass $\rho$[kg/m$^3$].

For the 1D formulation, the boundary conditions will be dirichlet conditions (thus having a fixed boundary temperature) ending at one side into the heatsink, being at a fixed temperature during the simulation and at the other side, it will end in the structure which presses the thermographic material against the nib structure, being normally also at a fixed temperature.

Figure 5:
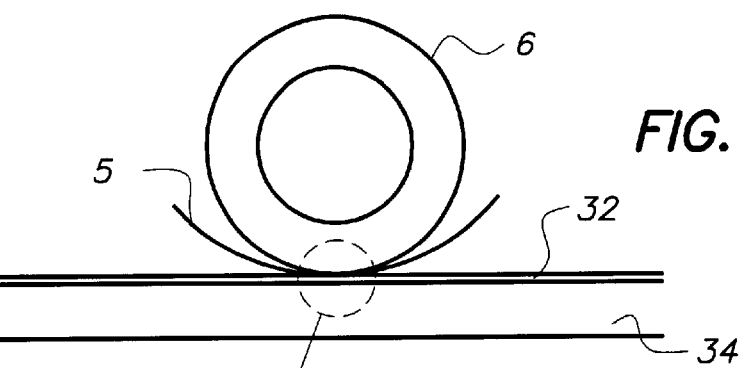
FIG. 5 shows a side view of a thick film head in contact with a thermographic material.
Figure 6:
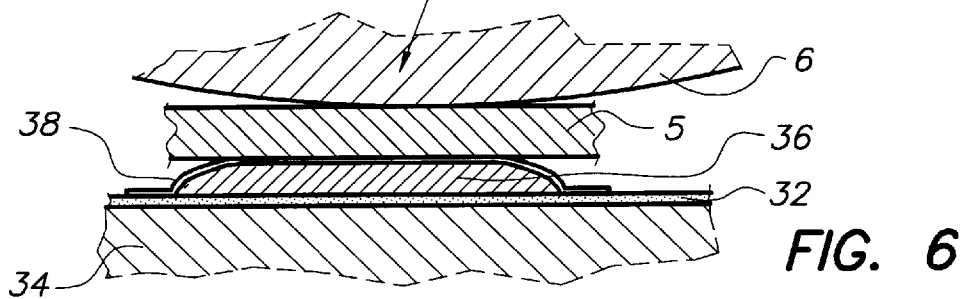
FIG. 6 shows an enlarged cross section of a thick film head and the different material layers.

This will be illustrated with an example. Consider a thick film head with a resistor lying on a thin layer of glass; a cross section of this configuration is shown in FIGS. 5–6. This glass 32 is deposited on a ceramic substrate 34 and fixed to a heatsink (not shown). Using e.g. a rubber roller 6, the thermographic material is pressed against the heating element.

From this structure, a thermal calculation scheme can be made based on a finite-element-model FEM or on a finite-difference-model FD of this structure. A 1D model is indeed a strong approximation of a real 3 dimensional structure. But the nature of the heat diffusion process will be the same for the one-dimensional 1D, two-dimensional 2D or three-dimensional 3D problem. Our interest goes to the relative behaviour of the temperature reached in the thermographic material with regard to a given sequence $S_k$ of heat production in the heating element. Of course it is beneficial to use a 3D calculation and will of course give the most correct result, but it can be too expensive and too time consuming.

A thermal process as applied to direct thermography is characterised by following general heat equation PDE:

$$\rho c \frac{\partial T}{\partial t} = div(\lambda grad(T)) + q(x, y, z, t).$$ Equation 6:

Herein, the function q(x, y, z, t) gives the specific heat production in every point of the considered space and is exactly defined by the sequences $S_k$ applied to all heating elements.

Figure 14:
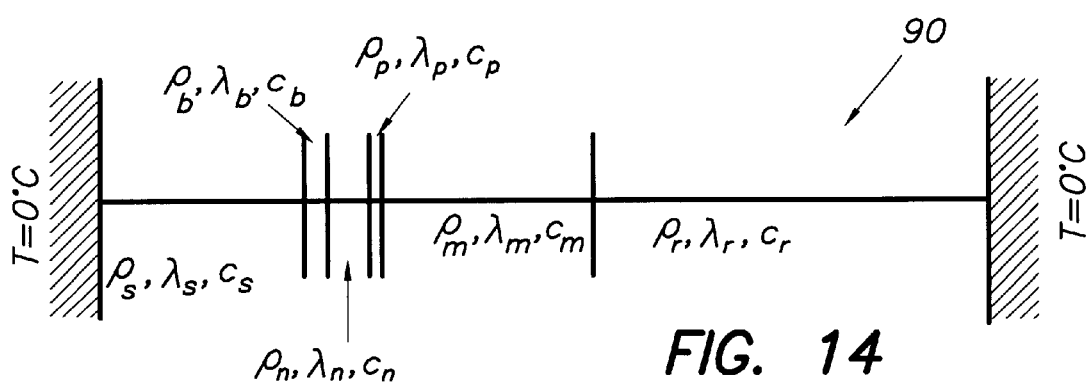
FIG. 14 shows a 1D model for a thermal head structure, in a line running from the heatsink, through the nib and the thermographic material up to a platen, as suitable in the present invention.

A 1D calculation scheme is made, by taking a line intersection through the nib perpendicular on the heatsink. In the model, the cross section is normalised to 1 m$^2$ and heat production in the nib is recalculated with regards to this normalised cross section. All dimensions in the 1D-direction must be taken correctly from the real structure as illustrated in FIGS. 5, 6 and 14.

The boundaries of our calculation scheme are simple dirichlet boundaries, assuming e.g. 0° C. on these boundaries. Physically, this is the heatsink or the inside structure of the pressing rollers, both with large time constants, allowing a constant temperature in these materials during the simulation.

For each material found in the 1D cross-section, the correct material properties must be inserted in the calculation scheme 90 (cf. $\rho$, $\lambda$ and c; defined hereabove in the section "Explanation of terms used in the present invention"). In the example of FIG. 14, we have the index s for a substrate 34 (e.g. a ceramic substrate), the index b for a bonding layer 32, the index n for the heating element or nib 29, the index p for a protecting layer 38 (e.g. a glass layer) over the heating element, the index m for the thermographic material 5 and the index r for the platen 6 (e.g. a rubber roller or a drum).

Now the step reading 'calculating transient temperature histories $Th_k$' in said thermographic material m for said sequences $S_k$ of time slices $s_i$ having different binary weights $w_i$ will be discussed in detail.

The only time dependent quantity in a transient simulation of the thermal diffusion equation for the different slice combinations giving the temperature history in the thermographic material, is the specific heat production q(t) [expressed in J/m$^3$] in the nib material.

We define a function u(t, $t_{start}$, $\Delta t$) graphically depicted in FIG. 8 as:

$$u(t, t_{start}, \Delta t) = 1 \text{ if } t_{start} \leq t < (t_{start} + \Delta t) \text{ 0 if } t < t_{start} \text{ or } t \geq (t_{start} + \Delta t)$$ Equation 7

The heat generation in the heating element volume for a slice $S_k$ can then be expressed as:

$$(q(t)|)_{S_k} = \frac{1}{V_{nib}} \sum_{i=0}^{N-1} (a_i^k P_{on} + (1 - a_i^k) P_{off}) \cdot u(t, t_{start}^{slice\, i}, t_{scale} * w_i)$$ Equation 8:

[expressed in W/m$^3$].

Herein $P_{on}$ [W] is the total power applied to a nib when $a_i$ equals 1; $P_{off}$ [W] the applied power to the heating element which is not actively steered ($a_i$=0) but still might have some parasitic heat generation; and $V_{nib}$ [m$^3$] the equivalent heating element material volume that will dissipate the power applied to it.

The magnitudes of the applied powers $P_{on}$ and $P_{off}$ are known from the electrical configuration of the thermal head.

In this way, the heat generation in the heating element is fully described by the slicing process. In total, one has $2^N$ available combinations for a certain fixed slice order.

We have now an exactly described mathematical calculation scheme (FEM or FD) with known material properties for every layer in our model ($\rho$, $\lambda$, c), known boundary conditions and a known heat production in the nib layer q(t) for $2^N$ different combinations (see FIG. 14). The 1 dimensional heat diffusion equation (PDE) can now be solved for this problem:

$$\rho c \frac{\partial T(x,t)}{\partial t} = \frac{\partial}{\partial x}\left(k(x)\frac{\partial T(x,t)}{\partial x}\right) + q(x,t). \qquad \text{Equation 9:}$$

Details concerning the actual numerical details of these calculations are not given in this document, as this is a general mathematical issue. Many textbooks describe the theory about the FEM or the FD method that can be used for transient problems. Also, if necessary, other numerical techniques can be used.

The solution will be available during the calculation in all nodes of the model. In practice, only the solution in the thermal sensitive layer of the thermographic material must be saved for later post processing. This should comprise at least one node, e.g. somewhere in the middle of the image forming emulsion. More nodes can be taken, depending on the evaluation function to be used later on.

Now the step reading 'establishing a relationship between said transient temperature histories $Th_k$ and said output values $D_{kcm}$ will be disclosed thoroughly.

In modelling the image forming behaviour in the thermographic material, special attention is focussed on the question what the pixel output is of the image forming process for a given transient temperature history. The theoretical function representing the pixel output will be denoted by $Dh_k=f(Th_k)$. Herein, at least two cases may be differentiated:

- The nib is used to print pixel values, in which case the microscopic density (if necessary for a certain colour) in the pixel output is the representative target function for $Dh_k$, or
- The microscopic density is driven up to a saturating value, making only the size of the pixel formed by the nib being important (cf. raster imaging) and giving $Dh_k$ a dimensional value. Often only 1 dimension will be considered, e.g. the width of the pixel relative to the width of the nib.

The input in the calculation of $Dh_k$ is the knowledge of the temperature history $Th_k$ in one or several points in the thermographic material. This relationship is in practice not obvious as it is based on chemical reactions and diffusion processes in the thermographic material. From the reaction kinetics and the optical properties of the chemical components, a temperature and time dependent relation with the pixel output $Dh_k$ can be established.

We have found that a very good function for representing the pixel output $Dh_k$ is proportional to the maximum temperature reached in the thermographic material. In a thermographic system with the heat generated outside the thermographic material, the time constant of the heat present in some point, is generally greater than the time constant of the diffusion process governing the image forming. When a temperature T is reached, the temperature will be long enough around T for producing a pixel output which is independent in how that temperature T has been formed (within given constraints).

In other cases, one might make a histogram of how long the thermographic material was exposed to a certain temperature. The longer it was exposed to temperature T, the more will be the contribution of T. Some weighted integral could then be used as the representing function of the pixel output $Dh_k$.

Figure 15:
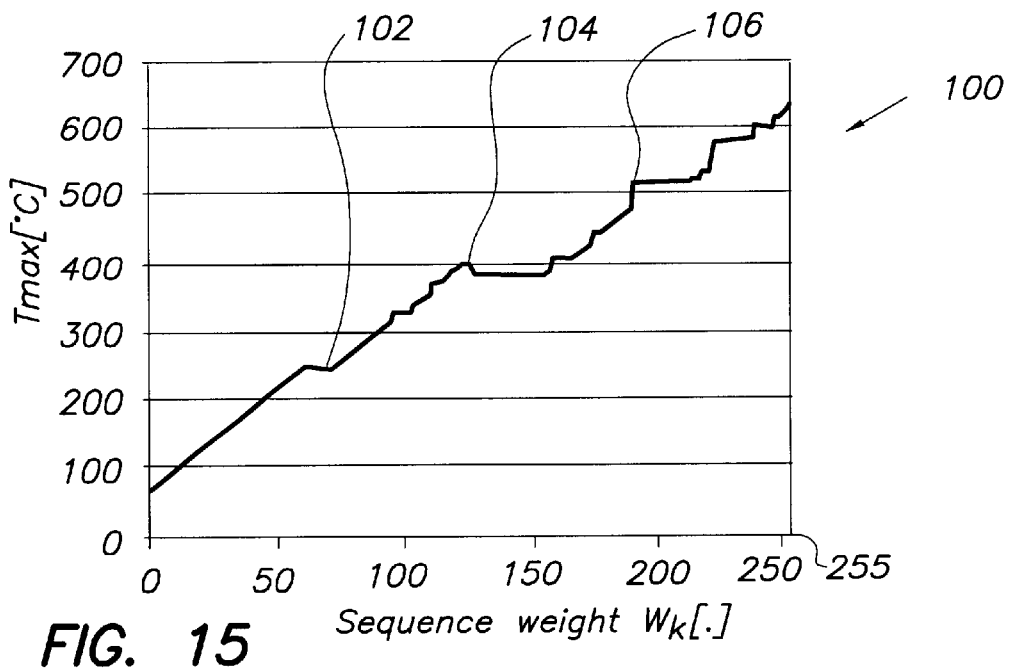
FIG. 15 shows a maximum temperature in a thermographic material as a function of an increased electrical excitation weight, as suitable in a method according to the present invention.

The above is illustrated with an example. For a given thermal head configuration, a transient simulation has been made for a slice with 8 weights having binary weights {1, 2, 4, 8, 16, 32, 64, 128}. For the 255 levels, the maximum temperature Tmax occurring in the thermographic material has been calculated; see FIG. 15, wherein 100 shows a maximum temperature relating to sequence weights $W_k$, 102 shows a non-monotony in temperature at a sequence weight of 64, 104 shows a non-monotony in temperature at a sequence weight of 128, and ref. nr. 106 shows a non-monotony in temperature at a sequence weight of 196. This maximum temperature is in most cases representative for the pixel output $Dh_k$ on the thermographic material. One notices directly discontinuities around the major weight jumps, e.g. 63 to 64, 127 to 128, 195 to 196 and a lot of smaller jumps concerning the 15 to 16 transition(the so-called "lowest nibble 01111 to 1000 transition").

The step of 'storing first entries for continuous and monotone output values $Dh_{kcm}$ and second entries for corresponding sequences $S_k$ into a second table LUT2' now will be explained.

As mentioned before, the pixel output $D_k$ is fully described by the printing sequence $S_k$ according to $$D_k=F(S_k). \qquad \text{Equation 10}$$

From a software point of view, a sequence $S_k$ defines a certain slice order and a set of numbers defining active heating during a slice period. By selecting a set of sequences $S_k$ and ordering them into a table LUT, the index k of this table becomes a simple numerical unit that easily can be used in a software program. For the purpose of controllability, it is essential to make at least a continuous and monotone relationship between the index k of the lookup table and the corresponding pixel output obtained by activating the heating element by the sequence $S_k$ found at the table index k.

This can be represented by a virtual function $F_{cm}$, that is continuous as the function of the index k and monotone, according to:

$$\text{if } D_k=F_{cm}(k) \text{ and } D_l=F_{cm}(l) \text{ and } k<l \text{ then } D_k<D_l. \qquad \text{Equation 11}$$

The definition of $F_{cm}$ being continuous in the index k may to be formulated more specifically, as k is not a real number, but a natural number. Continuity of the output value $D_k$ is then formulated as giving for increasing k values, a continuous perception for the human eye, implying that for an increase in k of 1, a maximum increase or decrease in the output $D_k$ is present, or:

$$|D_k-D_{k+1}|<\Delta D_{max} \text{ or } |F_{cm}(k)-F_{cm}(k+1)|<\Delta D_{max}, \qquad \text{Equation 12}$$

with $\Delta D_{max}$ a maximum single step in output value.

The function $F_{cm}$ has to be defined starting from a functional point of view and may comprise any shape, as far it fulfils Equation 11 and Equation 12 according to k; e.g. a linear shape, or parabolic, or hyperbolic, etc . . . .

$F_{cm}$ and LUT2 are related to each other as:

$$F_{cm}(k)=F(\text{LUT2}[k]). \qquad \text{Equation 13}$$

Theoretically, the contents of the table LUT2 can be found by selecting a set of target values for $D_k$ and selecting for the second entry the sequence $S_k$ from which $D_k$ originates. But as mentioned before in the background of the invention, $D_k$ values are often unavailable as the energy used is not sufficient to produce a pixel output on the image forming material m. For the purpose of cross-talk or temperature offsets in the substrate or heatsink, LUT2 entries must be defined as well for these low energy cases. Whenever the energy is large enough to measure a pixel output, $D_k$ values are mostly incorrect because of measuring errors, mutual cross-talk and unknown local substrate temperature. Therefore, we found that it is better to use the $Dh_k$ values. The step of storing first entries of $Dh_k$ values consists of selecting a continuous and monotone set GS' of $Dh_{kcm}$ values from the set GS of available and calculated $Dh_k$ values. From the relationship between $Dh_k$ and $Th_k$, and $Th_k$ and $S_k$, the second entry of the table can be found as being $S_k$ that will give a theoretical pixel output $Dh_{kcm}$.

In a further preferred embodiment according to the present invention, said step of storing into a second table LUT2 is replaced by a step of storing first entries for continuous, monotone and linear output values $Dh_{kcm1}$ and second entries for corresponding sequences $S_k$ in a third table LUT3, is explained by the following.

The mathematical process of compensation (cf. neighbour or cross-talk compensation, heatsink temperature compensation) assumes that the selected sequence $S_k$ for heating element n produces a pixel output $D_k$ and furthermore, that the principle of linearity is fulfilled or at least very good approximated. For the purpose of controllability, if a linear relation exists between the index k of the lookup table and the corresponding pixel output $D_k$ produced by the corresponding sequence $S_k$ of the second entry in that table, the principle of linear superposition can be applied when describing the interaction of several sources contributing to the pixel output of a nib n. As an example, by cross-talk, the pixel n+1 when being printed, will give contribution to parasitic heat in pixel n. For a linear system, if pixel n+1 is printed using entry k of the table, a fraction f*k of the numerical value of k will be found in the pixel output of nib n. This can be compensated or when printing the pixel n by requesting an output found at the table index k-(f*k). The pixel output for pixel n will be the same as the output found for entry k when pixel n+1 is not printed. To realise this linear relationship, a table LUT3 will be constructed. The virtual function representing the image forming process $F_{cml}$ which is continuous, monotone and linear according to table LUT3 conforms:

$$D_k = F_{cml}(k) \rightarrow aD_k = F_{cml}(a \cdot k), a \in \Re_0^+ D_1 = F_{cml}(k_1) \text{ and } D_2 = F_{cml}(k_2) \rightarrow D_1 + D_2 = F_{cml}(k_1 + k_2)$$

Equation 14 with $$F_{cml}(k) = F(LUT3[k]).$$

Equation 15

The function $F_{cml}$ must fulfil the continuity (Equation 11) and monotony constraint (Equation 12) and can be constructed as:

$$F_{kcml}(k) = \left[Dh_{max} * \frac{k}{M}\right] + Dh_{offset},$$

Equation 16 with M the number of entries in LUT3, $Dh_{max}$ and $Dh_{offset}$ a real constant.

The first entry of the lookup table LUT3 is selected by selecting from the set GS a representative pixel output set GS" that contains $Dh_{kcml}$ values according to the relationship:

$$Dh_{kcml} = F_{cml}(k).$$

Equation 17

As a known relationship exists between the representative pixel output $Dh_{kcml}$ and the temperature history $Th_k$, and between $Th_k$ and $S_k$, for a given first entry $Dh_{kcml}$, the corresponding sequence $S_k$ can readily be entered.

There are two approaches available for constructing a linearised system of sequences.

First of all, one could use a redundant system of slice weights. This means that the process of writing the time slice ts as:

$$t = \sum_{i=0}^{N-1} a_i w_i t_{Scale}$$

Equation 18:

is not unique, meaning that more than one set of $\{a_i\}$ exists in order to write t. One gets this situation e.g. when having two or more the same values of $w_i$ in the slice vector. The pixel output of the time t will be different for these cases, as the distribution over time of the weights will be different. A certain pixel output $D_k$ can then be realised in different manners. When selecting then a linear scale of $Dh_k$, M in size, it will be no problem of finding a correct t value that can render this pixel size. M will be smaller than N.

Another approach consists of keeping all the weights $w_i$ different and searching a set of weights, in total M, being now equal to N, by simply changing the weight values until a monotonous and maybe even linear pixel output $Dh_k$ is found with regard to the index k. For this, one can start form the binary weights—e.g. $\{1, 2, 4, 8, 16, 32, 64, \ldots\}$—and for every transition from a set of smaller weights to one higher weight, trying to adopt this higher weight so that the transition happens smoothly and monotonous. Example: experiments show that it is better to start printing with the smallest weights and finish with the largest weights. Consider the transition from $\{1, 2, 4, 8, 0, 0, 0, \ldots\}$ to $\{0, 0, 0, 0, 16, 0, 0, \ldots\}$. The slice set in the latter case will produce a pixel output with larger pixels than in the former case, with a perceptible jump, being not acceptable. A solution exists in dropping the value of the weight 16 until an acceptable increase of the size can be found. This process can be repeated for the higher slice weights.

After having fulfilled this step, the lookup table LUT2 or LUT3 is constructed straightforward so that a continuous monotone output curve for a selected set of sequences $S_k$ is provided.

In a further preferred embodiment of a method for thermal printing according to the present invention, the step of creating a time dependent power distribution $P_k = f(t)$ applicable to said heating elements $H^n$, wherein said power distribution $P_k$ is defined by a known function of time t and having a total energy level determined by the parameter k, or $P_k = f(t, k)$, will be further established.

In the state of the art thermal printing, using the heating element excitation layout of FIG. 4, the power applied to the heating element has a time dependence as given by Equation 5. But as technology advances, more exotic control electronics will be available in the near future, possibly making the necessity of slicing obsolete. E.g. individual driving stages for each heating element could have a programmable timer, allowing to supply the heating element with $P_{on}$ during a programmable time. The heating element technology will also evolve. So, the use of an intense laser beam can be able to replace an heating element. In that case, the time dependent power applied to the image forming material m, for a laser beam sweeping over it, may show a Gaussian time dependent profile and if necessary being repeated multiple times, giving a time dependent power applied to a particular pixel of the image forming material m, that is different from the constant voltage supplied heating element as in Equation 5. Therefore, the power supplied to a confined volume of the image forming material representing the pixel volume, can be denoted by a general time dependent function $P_k=f(t)$ [W], without having any constraints on the mathematical formulation of this function $P_k$. As the problem of compensation will always present itself (increased ambient temperature or humidity, cross-talk between excited pixels etc. . . ) the power delivered to the image forming material will be selectable and will mathematically be expressed by a parameter k, being a size limited integer number, having values 0 to K. For different values of k, $P_k$ will apply a different time dependent power to the image forming material and as a consequence, different values of the pixel output $D_k$ will result. The subject of the invention, as being explained and applied to a sequence $S_k$ of time slices $s_i$, can readily be applied to $P_k$. Using a calculation scheme, for the given material and geometrical set-up, the temperature histories $Th_k$ can be calculated in the image forming material m for all values of k. From these temperature histories $Th_k$, a representative pixel output $Dh_k$ can be calculated, giving a set GS of $Dh_k$ values with their corresponding power excitation schemes $P_k$. A subset GS' or GS" can be selected from GS as to give $Dh_k$ values that are continuous and monotone according to a predefined function $F_{kcm}$, or continuous, monotone and linear, according to a linear relationship $F_{kcml}$.

(v) Illustration of the Invention with a Practical Example

First, it is recapitulated that the core idea of the invention comprises:

building a representative FEM or FD model of the thermal head, making a transient simulation of the thermal diffusion equation for the different slice combinations, running an evaluation function on the solution found, giving a representative output for the image forming process, constructing an apt lookup table automatically so that one gets a continuous monotone output curve.

In the example of this section, the results depend of course very strongly on the type of thermal head used, and accordingly on the calculation scheme used for modelling the thermal head. But, in this context, it is just an illustration of the process of building an adequate lookup table.

A Finite Difference FD approach has been used for a 1D calculation scheme. A slice is used with 8 weights, being {1, 2, 4, 8, 16, 32, 32, 32}. The actual time slices are found by multiplication with a scale factor $t_{Scale}$, this for obtaining maximum density and pixelsize when printing a pixel with all slices on. The thermal head had such a configuration that when a pixel was driven during an on-slice, it dissipated a power P, and when not driven during a time slice, only P/9 was dissipated (cf. Equation 5, $P_{on}$ and $P_{off}$).

Several slices where taken with the same weight (here 32). This means that there are several possibilities to obtain a same summed weight, as an example: weight 64 can be made by {0, 0, 0, 0, 0, 0, 32, 32} or {0, 0, 0, 0, 0, 32, 0, 32} or {0, 0, 0, 0, 0, 32, 32, 0}. But the pixel output will possibly differ, because the distribution of time the nib is dissipating heat is different. The choice of these sets of weights has been done deliberately to have "choices" when composing the table LUT2, representing the function $F_{cm}$. Different weights will be available for making a same pixel, giving more freedom in the construction of the lookup table.

Figure 16:
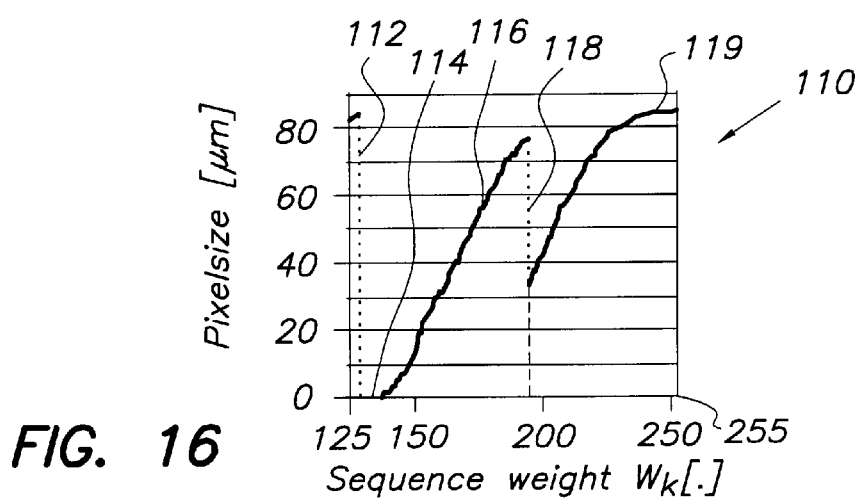
FIG. 16 shows the measured pixel size from a macro density measurement for a binary slicer with weights in the range from 125 to 255, as suitable in a method according to the present invention.

In one experiment, a printout on the real printing device has been made (see FIG. 16) with the binary weights from 125 {1, 0, 4, 8, 16, 32, 32, 0} to 255 {1, 2, 4, 8, 16, 32, 32, 32}. Herein, ref. nr. 110 is a pixel size relating to sequence weight, 112 is a discontinuity in pixel size at a sequence weight of 128, 114 is a discontinuity in pixel size and more particularly being an invisible pixel output zone, 116 is a continuous and monotone zone, 118 is a discontinuity in pixel size at a sequence weight of 196, and ref. nr. 119 is a saturation in pixel size at higher sequence weights. The pixel size is indirectly obtained from a macro density measurement. For the high excitation weights, a saturation occurs in the pixel output. This is due to a burning of the film, decreasing again the density of the film. There are also limits for a small nib to the absolute maximum pixel it can create.

Figure 17:
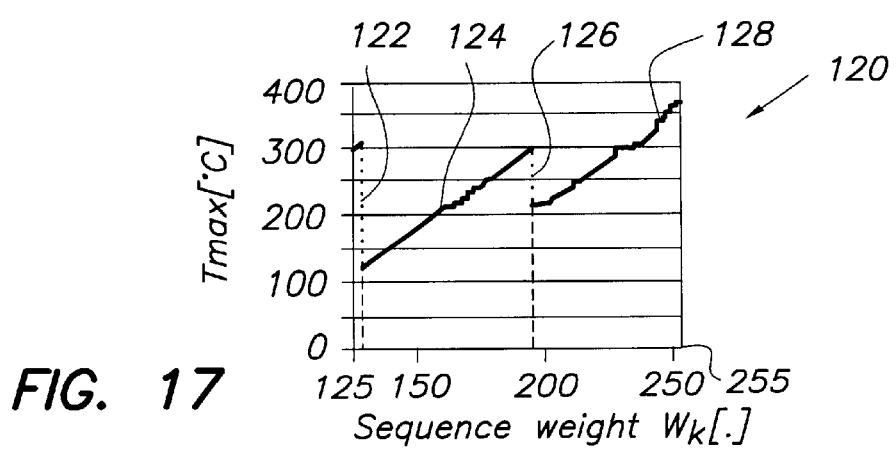
FIG. 17 shows the calculated $T_{max}$ function for binary slices with weights in the range from 125 to 255, as suitable in a method according to the present invention.

In a second experiment, the numerical 1D model was applied and as a function representing the pixel output, the peak temperature ($T_{max}$) occurring in the thermal sensitive layer, has been selected. The calculation result is graphically represented in FIG. 17 showing calculated $T_{max}$ function for slice with weight vector {1, 2, 4, 8, 16, 32, 32, 32}. Herein , following referral numbers are used: 120 is a partial curve of the maximum temperature in the thermographic material m relating to sequence weights $W_k$, 122 is a discontinuity in maximum temperature at a sequence weight of 128, 124 is a monotone zone showing some points of small discontinuities, 126 is a discontinuity in temperature at a sequence weight of 196, and 128 is another monotone and partly continuous zone.

One finds a great similarity when comparing this picture (FIG. 17) with the measured pixel size (FIG. 16) if looking in the range from 125 to 255. Of course, the saturation effect 119 in the pixel output 110 for the high weight values is not visible in the $T_{max}$ calculation 120.

Figure 18:
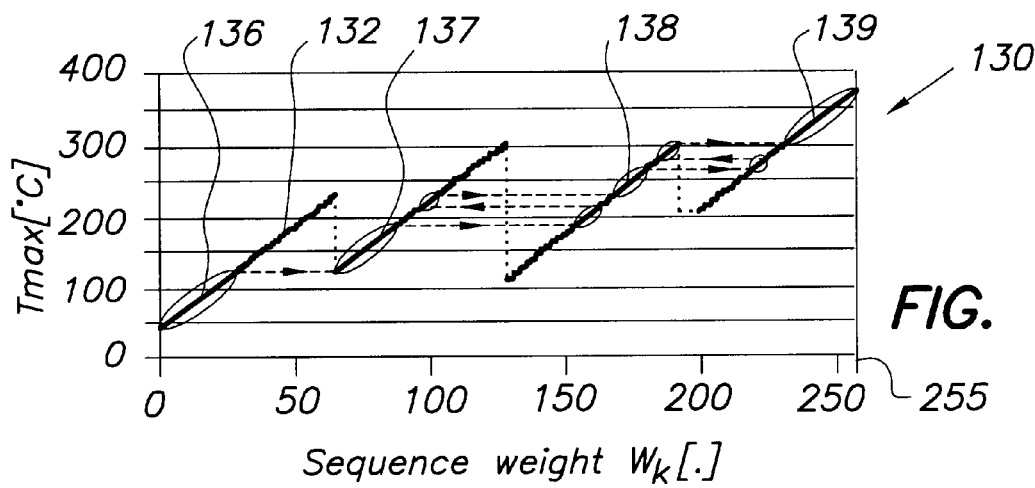
FIG. 18 shows calculated $T_{max}$ values for a slicer with weight vector {1, 2, 4, 8, 16, 32, 32, 32} and several points marked for inclusion to the LUT2 table, as applicable in a method according to the present invention.

Based on the values of $T_{max}$, we can select a set of $T_{max}$ values which forms a linear monotonous vector of values. It does not make sense to try to form a vector with 255 elements. In our case, this is limited to 128 values in a first selection and after a few corrections limited to N=120. The selection is based on the principle to progressively select those sequences that give a continuous increase of the calculated $T_{max}$ value. Whenever a linear range is not available, one can take a range for some higher weight giving approximately the same $T_{max}$ value. Reference is made to FIG. 18 which shows the marked zones on the curve 132 relating $T_{max}$ to sequence weights and indicating the weights that have been selected for the LUT2 table. Herein, 130 represents a calculated $T_{max}$ for a weight system {1, 2, 4, 8, 16, 32, 32, 32} with zones selected for the LUT2 table, 136 is a first selected zone of Tmax-curve, 137 is a second selected zone of Tmax-curve, 138 are third selected zones of Tmax-curve, and 139 are fourth selected zones of Tmax-curve.

Figure 19:
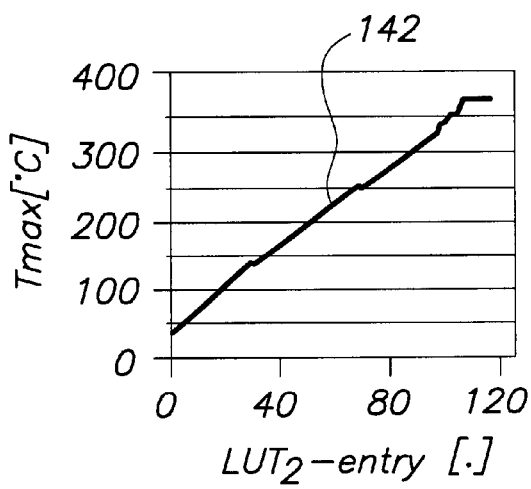
FIG. 19 shows the theoretically calculated maximum temperature $T_{max}$ in a thermographic material m for a continuous and monotone set of sequences according to the present invention.
Figure 20:
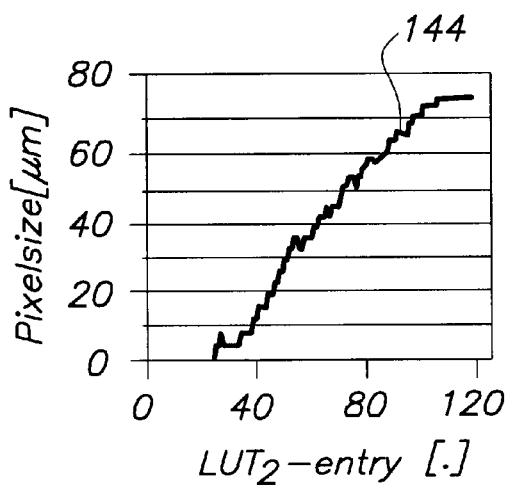
FIG. 20 shows the measured pixel sizes on a thermographic material for a continuous and monotone set of sequences according to the present invention.

In a third experiment as a final result, with the selected table LUT2, a printout has been made and the corresponding pixel size has been measured (FIG. 20). Also the $T_{max}$ curve for the weights used has been shown in a diagram (FIG. 19). Herein, ref. nr. 142 is a Tmax-curve related to LUT2-entries, and 144 is a pixelsize-curve related to LUT2-entries.

One may remark that the pixel size does not behave fully linearly regarding the LUT2 index in FIG. 20. Also, the pixel sizes in this same figure are smaller than those in FIG. 16. These effects are caused by an increased heatsink temperature, which makes a sole experimental attack of this problem practically infeasible as it is extremely difficult to run all the experiments under an isothermal condition. To compensate for this change in heatsink temperature, one needs to install a heatsink compensation algorithm.

(vi) Further Preferred Embodiments According to the Present Invention

From the above, it may be clear that in a preferred embodiment of a method according to the present invention, said output values $D_k$, $D_{kcm}$ and $D_{kcml}$ relate to values of an optical density and/or to values of a pixel size to be reproduced on said thermographic material m.

In a further preferred embodiment, said model describes a heat diffusion process in said thermal printing system.

In a further preferred embodiment, said model is carried out by a heat diffusion partial differential equation PDE, comprising dimensions and thermal characteristics of all materials or layers contributing to said heat diffusion process.

In a further preferred embodiment, said thermal characteristics comprise a specific mass $\rho$, a thermal conductivity $\lambda$ and a specific heat c.

In a further preferred embodiment, said step of simulating said transient temperature histories $Th_k$ in said thermographic material m is carried out by solving said heat diffusion partial differential equation for all sequences $S_k$ of time slices $s_i$ having different binary weights $w_i$.

In a further preferred embodiment, said step of storing into said second table LUT2 comprises substeps of making an explicit tabulation of different sequences $S_k$ and calculated output values $Dh_k$, selecting an ordered subset of output values $Dh_{kcm}$ showing a continuous and monotone relationship, storing into a second table LUT2 first entries for continuous and monotone output values $Dh_{kcm}$ and second entries for corresponding sequences $S_k$.

In still another preferred embodiment according to the present invention, a method for improving controllability of a thermal printing system comprising a thermal printer having a thermal head TH incorporating heating elements $H^n$ and a thermographic material m, said method comprising the steps of creating a time dependent power distribution $P_k=f(t)$ applicable to said heating elements $H^n$, wherein said power distribution $P_k$ is a known function of time t and having a total energy level determined by the parameter k, or $P_k=f(t,k)$;

determining for every power distribution $P_k$, a corresponding transient temperature history $Th_k=f(x,y,z,t)$ in said thermosensitive layer;

calculating for each said transient temperature history $Th_k$ a corresponding output value $Dh_k$, giving a set GS of output values $Dh_k$ with corresponding power distributions $P_k$;

selecting from said set GS of output values $Dh_k$, an ordered subset GS' of output values $Dh_{kcml}$ realising a continuous and monotone predefined output $Dh_{kcm}= F_{cm}(k)$;

storing into a table LUT2 first entries for said ordered subset GS' of output values $Dh_{kcm}$ and second entries for corresponding power distributions $P_k$.

In a further preferred embodiment, said step of storing into a second table LUT2 is replaced by a step of storing first entries for continuous, monotone and linear output values $Dh_{kcml}=F_{cml}(k)$ and second entries for corresponding power distributions $P_k$ in a third table LUT3.

In a still further preferred embodiment, said output values $Dh_k$, $Dh_{kcm}$ and $Dh_{kcml}$ relate to values of an optical density and/or to values of a pixel size to be reproduced on said thermographic material m.

(vii) Further Applicability of a Method According to the Present Invention

The method of the present invention is applicable for a wide variety of printing techniques.

In "Direct thermal printing", the method may be directed towards representing an image of a human body obtained during medical imaging and to a printing of medical image picture data received from a medical imaging device, e.g. a medical image camera.

Another application of the present invention comprises hardcopy printing for so-called non-destructive Testing (NDT), based on e.g. radiographic or on ultrasonic systems. Exemplary purposes of NDT comprise inspection or quality control of materials, welded joints or assemblies; development of manufacturing processes; experimenting in research; etc.

In another preferred embodiment of the present invention, the image data may be graphical image picture data received e.g. from a computerised publishing system. Further, a method according to the present invention also may be applied in graphic plotters, in chart recorders, in computer printers, etc.

A method according to the present invention also may be applied in label printing by means of thermography. Thermographic label printing is described e.g. in WO 00/32403 (applicants Agfa-Gevaert and Esselte). More particular applications within the field of label printing comprise cash register coupons, weight scale labels, etc.

Still another application of the present invention comprises thermographic printing of a bar code. Bar code technology has become increasingly popular for identification and retrieval of all kinds of goods: from grocery store applications over medical laboratories, automobile industry, blood banks, electronics and libraries, etc.

Still another application of the present invention comprises thermographic printing of greeting cards and thermographic printing of security documents. Security documents must be verifiable on their authenticity and comprise e.g. all kinds of identification documents such as passports, visas, identity cards, driver licenses, bank cards, credit cards, security entrance cards, and further value-documents such as banknotes, shares, bonds, certificates, cheques, gaming and lottery tickets and all kinds of entrance and transit tickets such as aeroplane tickets and railroad tickets.

Thermal imaging according to the present invention can be used for production of both transparencies and reflection-type prints. In the hard copy field, thermographic recording materials based on an opaque (e.g. white) base are used, whereas in the medical diagnostic field monochrome (e.g. black) images on a transparent base find wide application, since such prints can conveniently be viewed by means of a light box.

A further application of the present invention provides means to assist blind people and persons with vision impairment. In "Research Disclosure" 32478 (dd. April 1991, page 268, disclosed anonymously) a method is described for obtaining embossed Braille-like output using special paper (e.g. coated with a layer of thermally expandable plastic, e.g. a styrene compound) in a thermal printer. In a Braille coding, all characteristics (such as letters, numerals, punctuation marks, symbols, etc) are represented by specific combinations of six tangible points or dots.

Heat supplied by the printhead of a thermal printer produces a perceptible output, because the localised heat produces a reaction in which the plastic layer creates raised dots.

Alternatively, a computer program may be used to produce a series of raised dots representing data in graphical form, such as charts or maps.

In order to get a continuous and monotone physical output for high resolution tactile graphics, a method according to the present invention may be used advantageously.

The present invention describes a technique of building a table that establishes a continuous and monotone relationship between a pixel output and an index value of a lookup table LUT. In a preferred embodiment, the table will be constructed as to give a more or less linear relationship, giving in fact an output system that has linear properties. This property of being linear is beneficial for any control algorithm and compensation technique that is used in controlling the pixel output. As an example, cross-talk between several heating elements (or nibs) presents a real problem in some commercial thick-film print heads. Cross-talk can be removed by performing a deconvolution technique on the image to be printed. Printing two pixels adjacent to each other in a same line will give then equal sized or equal dense pixels with regard to pixels being printed separately on different lines.

For commercial thermal printers, it is often important to have a fast print rate. From a technological point of view, this requires that a nib can be heated in a short time, in order to produce a pixel output on the thermographic material. On the other hand, a rest heat has to be evacuated fast to a heatsink in order to cool down the nib at a temperature low enough to give no smog at a next line to be printed. Therefore, the heatsink may show an unwanted temperature rise, influencing directly a starting temperature of the heating element when printing a new pixel on the next line. It is important to have a model that correctly gives a relationship between the pixel output and an offset temperature being present in the heatsink, as to be able to compensate for this offset temperature.

Further, it is important to indicate that for people skilled in the art, a so-called heating element may comprise e.g. a resistive heating element, an inductive heating element, a pyrotechnic heating element, or a high frequency heating element.

Having described in detail preferred embodiments of the current invention, it will now be apparent to those skilled in the art that numerous modifications can be made therein without departing from the scope of the invention as defined in the appending claims.

Parts List
1 a discontinuous curve
2 a discontinuity
3 a continuous, but non-monotone curve
4 a non-monotony
5 thermographic material m/thermographic imaging element Ie
6 a platen
7 hardcopy image
8 slowscan direction
10 thermal printer
16 input data
18 processing unit
20 thermal print head TH
21 serial input line
22 clock line
23 latch enabling line
24 strobe line
25 shift register
26 latch register
27 AND-gate
28 driver
29 heating element
30 control circuitry
32 bonding layer
34 substrate
36 heating material
38 protecting layer
40 schematic for parallel to serial conversion
42 schematic for serial outputs
44 schematic for parallel inputs
50 representation of function u
52 a time slice having a weight $w_0$ and being in an "on-state"
54 a time slice having a weight $w_1$ and being in an "on-state"
56 a time slice having a weight $W_{N_{nibs}-1}$ and being in an "on-state"
58 a time slice having a weight $w_1$ and being in an "off-state"
60 3D-representation of exemplary activation pulses
61 activation of the heating elements during a first time slice
62 second time slice activation of the heating elements
63 last time slice activation of the heating elements
64 first activation pulse for first heating element in a first slice
65 first activation pulse for last heating element in a first slice
66 last activation pulse for first heating element
67 last activation pulse for last heating element
68 activation pulse ('1') for nib $N_{nibs}-2$ during third slice
69 powerless activation pulse ('0') for nib 2 during third slice
72 temperature for a single heat pulse of 2 mJ
74 temperature for a first heat pulse of 1 mJ
76 temperature for a second heat pulse of 2 mJ
80 macrodensity relating to sequence weights
82 jump in density at a sequence weight of 64
84 jump in density at a sequence weight of 128
86 jump in density at a sequence weight of 196
88 saturation in density
90 calculation scheme showing materials and properties
100 maximum temperature relating to sequence weights {1, 2, 4, 8, 16, 32, 64, 128}
102 non-monotony in temperature at a sequence weight of 64
104 non-monotony in temperature at a sequence weight of 128
106 non-monotony in temperature at a sequence weight of 196
110 pixel size relating to sequence weight
112 discontinuity in pixel size at a sequence weight of 128
114 invisible pixel output zone
116 a continuous and monotone zone
118 discontinuity in pixel size at a sequence weight of 196
119 saturation in pixel size at higher sequence weights
120 partial curve of temperature $T_{max}$ relating to sequence weights {1, 2, 4, 8, 16, 32, 32, 32}
122 discontinuity in maximum temperature at a sequence weight of 128
124 a monotone zone with several points of discontinuity 126 discontinuity in temperature $T_{max}$ at a sequence weight of 196
128 another continuous and monotone zone
130 calculated Tmax for a weight system {1, 2, 4, 8, 16, 32, 32, 32} with zones selected for the LUT2 table
132 $T_{max}$-curve relating to sequence weights
136 first selected zone of $T_{max}$-curve
137 second selected zones of $T_{max}$-curve
138 third selected zones of $T_{max}$-curve
139 fourth selected zones of $T_{max}$-curve
142 $T_{max}$-curve related to LUT2-entries
144 measured pixelsize-curve related to LUT2-entries

I claim:

1. A method for printing an image using a thermal printing system comprising a thermal printer having a thermal head TH incorporating a plurality of energisable heating elements $H^n$ and a thermographic material m, said method comprising the steps of supplying image data Id corresponding to a plurality of output values $D_k$ to a processing unit of said thermal printer, reading a first table LUT1 comprising first entries for desired output values $D_k$ and second entries for sequences $S_k$ of time slices $s_i$ of activation pulses, transformation of said image data Id into corresponding sequences $S_k$ of time slices of activation pulses, wherein said transformation of said image data Id comprises a step of establishing a relation between output values $D_{kcm}$ which are both continuous and monotone, and corresponding sequences $S_k$ of time slices $s_i$ of activation pulses, providing said time slices of activation pulses to said heating elements $H^n$ of said thermal head TH, printing said image by transporting said thermographic material past and adjacent to said thermal head and by activating said heating elements $H^n$ of said thermal head, further comprising the substeps of:

building a calculation scheme representative for said thermal printing system, said calculation scheme taking into account thermal characteristics of said thermal head TH, thermal characteristics of said thermographic material m, thermal characteristics of a platen and specific heat productions $q_k$ as imposed by sequences $S_k$ of said time slices $s_i$ having different binary weights $w_i$;

calculating transient temperature histories $Th_k$ in said thermographic material m for said sequences $S_k$ of time slices $s_i$ having different binary weights $w_i$;

establishing a relationship between said transient temperature histories $Th_k$ and calculated output values $Dh_k$;

storing into a second table LUT2 first entries for continuous and monotone output values $Dh_{kcm}$ and second entries for corresponding sequences $S_k$.

2. The method according to claim 1, wherein said step of storing into a second table LUT2 is replaced by a step of storing into a third table LUT3 first entries for continuous, monotone and linear output values $Dh_{kcml}$ and second entries for corresponding sequences $S_k$.

3. The method according to claim 1, wherein said output values $D_k$ and $D_{kcm}$ relate to values of an optical density and/or to values of a pixel size to be reproduced on said thermographic material m.

4. The method according to claim 1, wherein said calculation scheme describes a heat diffusion process in said thermal printing system.

5. The method according to claim 1, wherein said calculation scheme is carried out by a heat diffusion partial differential equation, comprising dimensions and thermal characteristics of all materials or layers contributing to said heat diffusion process.

6. The method according to claim 5, wherein said step of calculating said transient temperature histories $Th_k$ in said thermographic material m is carried out by solving said heat diffusion partial differential equation for all sequences $S_k$ of time slices $s_i$ having different weights $w_i$.

7. The method according to claim 1, wherein said thermal characteristics comprise a specific mass $\rho$, a thermal conductivity $\lambda$ and a specific heat c.

8. The method according to claim 1, wherein said step of storing into said second table LUT2 comprises substeps of making an explicit tabulation of different sequences $S_k$ and calculated output values $Dh_k$, selecting an ordered subset of output values $Dh_{kcm}$ showing a continuous and monotone relationship according to a predefined function $Dh_{kcm}$, storing into a second table LUT2 first entries for continuous and monotone output values $Dh_{kcm}$ and second entries for corresponding sequences $S_k$.

* * * * *